US010048978B2

(12) United States Patent
Iyobe

(10) Patent No.: US 10,048,978 B2
(45) Date of Patent: Aug. 14, 2018

(54) APPARATUS AND METHOD FOR IDENTIFYING A VIRTUAL MACHINE HAVING CHANGEABLE SETTINGS

(71) Applicant: FUJITSU LIMITED, Kawasaki-shi, Kanagawa (JP)

(72) Inventor: Hiroshi Iyobe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 15/006,620

(22) Filed: Jan. 26, 2016

(65) Prior Publication Data
US 2016/0266924 A1 Sep. 15, 2016

(30) Foreign Application Priority Data
Mar. 9, 2015 (JP) ................................. 2015-045788

(51) Int. Cl.
G06F 9/455 (2018.01)

(52) U.S. Cl.
CPC .......... G06F 9/45558 (2013.01); G06F 2009/45562 (2013.01); G06F 2009/45591 (2013.01)

(58) Field of Classification Search
None
See application file for complete search history.

(56) References Cited

U.S. PATENT DOCUMENTS

| 8,782,809 | B2 * | 7/2014 | Baset | G06F 21/566 713/187 |
| 8,949,827 | B2 * | 2/2015 | Becker | G06F 9/45558 718/1 |
| 8,966,082 | B2 * | 2/2015 | Chaturvedi | H04L 61/2015 709/226 |
| 9,305,147 | B1 * | 4/2016 | Azmat | G06F 21/121 |
| 9,501,224 | B2 * | 11/2016 | Lagar Cavilla | G06F 9/45558 |
| 9,634,948 | B2 * | 4/2017 | Brown | H04L 47/323 |
| 9,729,660 | B2 * | 8/2017 | Venkatesan | H04L 67/2842 |
| 9,787,633 | B2 * | 10/2017 | Bhagwat | H04L 61/2061 |
| 2009/0183173 | A1 * | 7/2009 | Becker | G06F 9/45533 719/313 |
| 2011/0142053 | A1 * | 6/2011 | Van Der Merwe | H04L 47/72 370/395.1 |

(Continued)

FOREIGN PATENT DOCUMENTS

| JP | 2006-079350 | 3/2006 |
| JP | 2013-114271 | 6/2013 |
| JP | 2013-168771 | 8/2013 |

Primary Examiner — Hiren Patel
(74) Attorney, Agent, or Firm — Staas & Halsey LLP

(57) ABSTRACT

At a first time of detecting, from among a plurality of virtual machines as management targets, a first virtual machine that has not stored therein identification information generated based on an internal time of the computer, an apparatus causes the first virtual machine to store first identification information generated based on a first internal time of the computer corresponding to the first time, and at a second time of detecting a second virtual machine which has stored the first identification information and whose setting regarding network connection has been changed after storing the first identification information, the apparatus cause the second virtual machine to store second identification information generated based on a second internal time of the computer corresponding to the second time.

7 Claims, 20 Drawing Sheets

(56) References Cited

U.S. PATENT DOCUMENTS

| | | | |
|---|---|---|---|
| 2011/0238820 A1* | 9/2011 | Matsuoka | G06F 9/5077 709/224 |
| 2012/0110574 A1* | 5/2012 | Kumar | G06F 9/45558 718/1 |
| 2012/0275328 A1* | 11/2012 | Iwata | H04L 12/4633 370/252 |
| 2013/0191828 A1* | 7/2013 | Wells | G06F 8/63 718/1 |
| 2013/0254765 A1* | 9/2013 | Shinohara | G06F 8/65 718/1 |
| 2014/0137272 A1* | 5/2014 | Baset | G06F 21/554 726/32 |
| 2014/0201554 A1* | 7/2014 | Yamazaki | G06F 1/3287 713/324 |
| 2014/0208319 A1* | 7/2014 | Yoshimura | G06F 21/53 718/1 |
| 2014/0297597 A1* | 10/2014 | Matsubara | G06F 9/461 707/681 |
| 2015/0007176 A1* | 1/2015 | Kotani | G06F 9/45533 718/1 |
| 2016/0127509 A1* | 5/2016 | Uriel | H04L 61/103 709/203 |
| 2016/0234872 A1* | 8/2016 | Liu | H04W 48/18 |
| 2016/0246649 A1* | 8/2016 | Tsirkin | G06F 9/5016 |
| 2016/0266924 A1* | 9/2016 | Iyobe | G06F 9/45558 |

* cited by examiner

FIG. 9

CONNECTION HISTORY INFORMATION GROUP 112

112a

| ID | MONITORING SERVER ID | DATE AND TIME OF UPDATE | IP ADDRESS | MAC ADDRESS | HOST NAME | IMMEDIATELY PRECEDING HISTORY ID |
|---|---|---|---|---|---|---|
| 1 | 0001 | 2014/01/01 00:00:00 | 192.168.0.1 | 00-00-00-00-00-01 | host1 | - |
| 2 | 0001 | 2014/01/01 00:10:00 | 192.168.0.2 | 00-00-00-00-00-01 | host1 | 1 |
| 3 | 0002 | 2014/01/01 00:20:00 | 192.168.10.1 | 00-00-00-00-00-02 | host2 | 1 |
| ... | ... | ... | ... | ... | ... | ... |

FIG. 11

MONITORING INFORMATION GROUP — 121

121a

| ID | TYPE | DATE AND TIME OF OCCURRENCE | DEGREE OF IMPORTANCE | MESSAGE TEXT | NODE ID | STATE |
|---|---|---|---|---|---|---|
| 1 | EVENT LOG | 2014/01/01 00:00:00 | IMPORTANT | XXXX HAS BEEN ABNORMALLY TERMINATED | node0001 | UNRESOLVED |
| 2 | EVENT LOG | 2014/01/01 00:10:00 | ALERT | XXXX IS RESTARTED | node0001 | UNRESOLVED |
| 3 | EVENT LOG | 2014/01/01 00:20:00 | ALERT | OS IS OUT OF MEMORY | node0002 | RESOLVED |
| ... | ... | ... | ... | ... | ... | ... |

FIG. 12

211a 0001, 20140101000000, 192.168.0.1, 00-00-00-00-00-01, host1
0001, 20140101001000, 192.168.0.2, 00-00-00-00-00-01, host1
0002, 20140101002000, 192.168.10.1, 00-00-00-00-00-02, host2

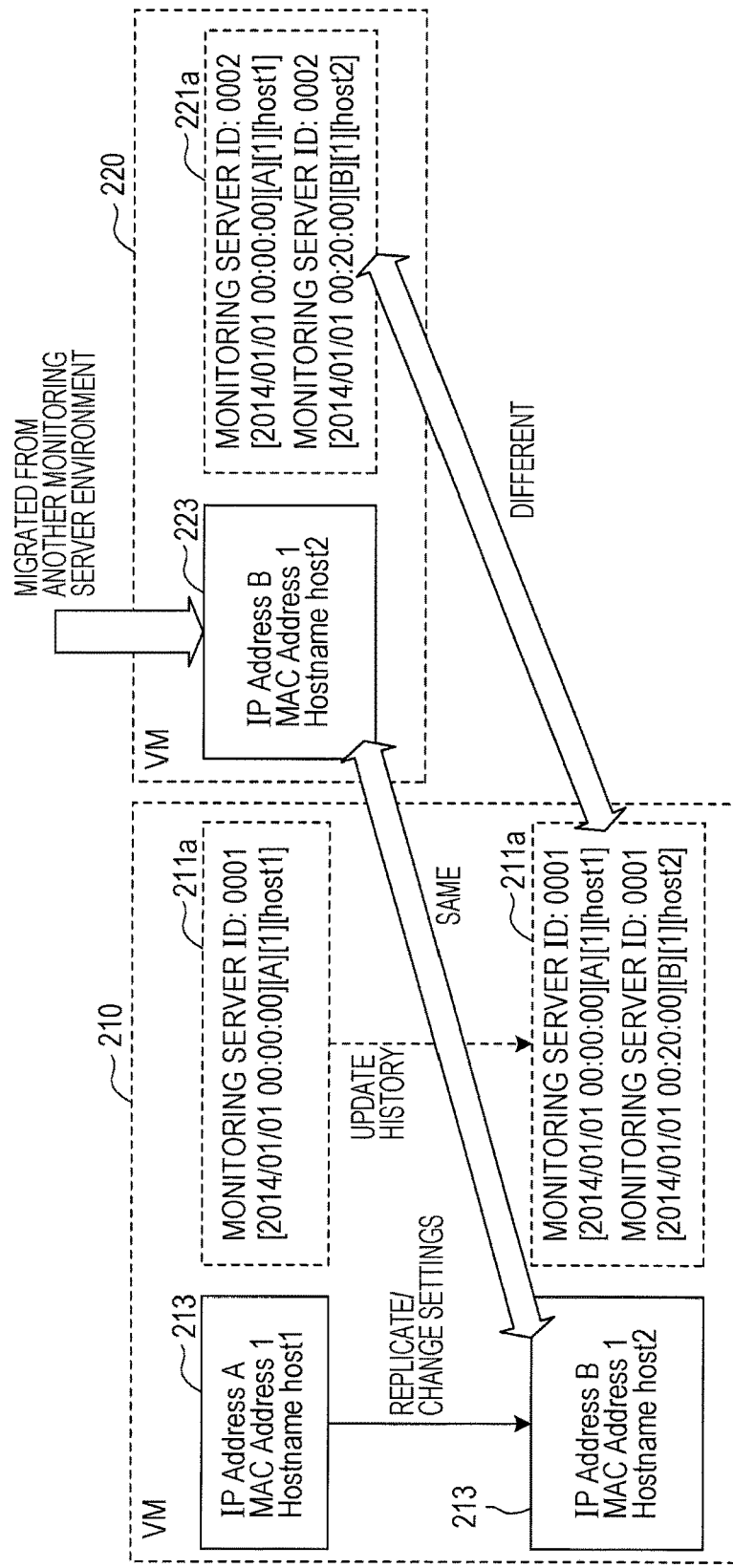

A PPARATUS AND METHOD FOR
IDENTIFYING A VIRTUAL MACHINE
HAVING CHANGEABLE SETTINGS

CROSS-REFERENCE TO RELATED
APPLICATION

This application is based upon and claims the benefit of priority of the prior Japanese Patent Application No. 2015-045788, filed on Mar. 9, 2015, the entire contents of which are incorporated herein by reference.

FIELD

The embodiments discussed herein are related to apparatus and method for identifying a virtual machine having changeable settings.

BACKGROUND

In cloud computing system (hereinafter referred to as cloud) operation, a manager of an infrastructure which provides a server environment has also conventionally performed system monitoring and business operation monitoring. By contrast, in recent years, with development of cloud computing technology, system monitoring is performed by the manager of the infrastructure, and business operation monitoring is performed by a cloud user. In this manner, system monitoring and business operation monitoring have been performed by separate operators.

In business operation monitoring, each server is not directly monitored, but node management information prepared in configuration management information of a monitoring server is used to perform monitoring operation. Here, the node management information has a one-to-one correspondence with a monitoring target server, and includes configuration information about hardware and software regarding the monitoring target server and monitoring settings such as monitoring target items. For example, the monitoring server monitors the monitoring target server, regularly updates the node management information so that the node management information matches the configuration of the monitoring target server, and also monitors each server with monitoring settings set by a user to the node management information.

As monitoring technology, for example, there is a network configuration management system which automatically detects a physical position of a personal computer (PC) and traces movement of the PC. Also, a network monitoring system which detects redundancy of media access control (MAC) addresses has been thought.

Japanese Laid-open Patent Publication Nos. 2006-079350 and 2013-168771 are examples of related art.

SUMMARY

According to an aspect of the invention, at a first time of detecting, from among a plurality of virtual machines as management targets, a first virtual machine that has not stored therein identification information generated based on an internal time of the computer, an apparatus causes the first virtual machine to store first identification information generated based on a first internal time of the computer corresponding to the first time, and at a second time of detecting a second virtual machine which has stored the first identification information and whose setting regarding network connection has been changed after storing the first identification information, the apparatus cause the second virtual machine to store second identification information generated based on a second internal time of the computer corresponding to the second time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of connection history information, according to an embodiment;

FIG. 11 is a diagram illustrating an example of monitoring information, according to an embodiment;

FIG. 12 is a diagram illustrating an example of a connection history information file retained in a VM, according to an embodiment;

FIG. 20 is a diagram illustrating an example of a case where a VM under another monitoring server is migrated, according to an embodiment.

DESCRIPTION OF EMBODIMENTS

In a cloud, a virtual machine (VM) is operated on a physical machine, and a user is allowed to use the virtual machine. In the virtual machine, what used to be implemented by hardware is implemented by software. Therefore, the virtual machine does not have unique fixed information.

For example, an Internet protocol (IP) address is not fixedly used for one VM because IP addresses pooled in advance are reused with settings of an operating system (OS) which operates on a plurality of VMs.

A physical machine may be uniquely specified by using information set in association with hardware, such as a MAC address set to an interface connected to a network.

By contrast, since the VM uses a virtual device, a MAC address is not associated with hardware, and is not usable as information for unique specification. As such, since the VM does not have unique fixed information, it is difficult for the monitoring server to reliably identify each of the plurality of VMs.

Moreover, VMs are replicable. Therefore, even if some identification information is provided to a VM, a plurality of VMs having the same identification information are present if that VM is replicated. Therefore, merely providing identification information to a VM not having identification information is not enough to distinguish between a VM generated by replication and the replication source VM, and reliability in VM identification is low.

It is desired to reliably identify each of the plurality of VMs.

Hereinafter, embodiments are described with reference to the drawings. Note that a plurality of embodiments may be implemented in combination within a consistent range.

First Embodiment

Figure 1:
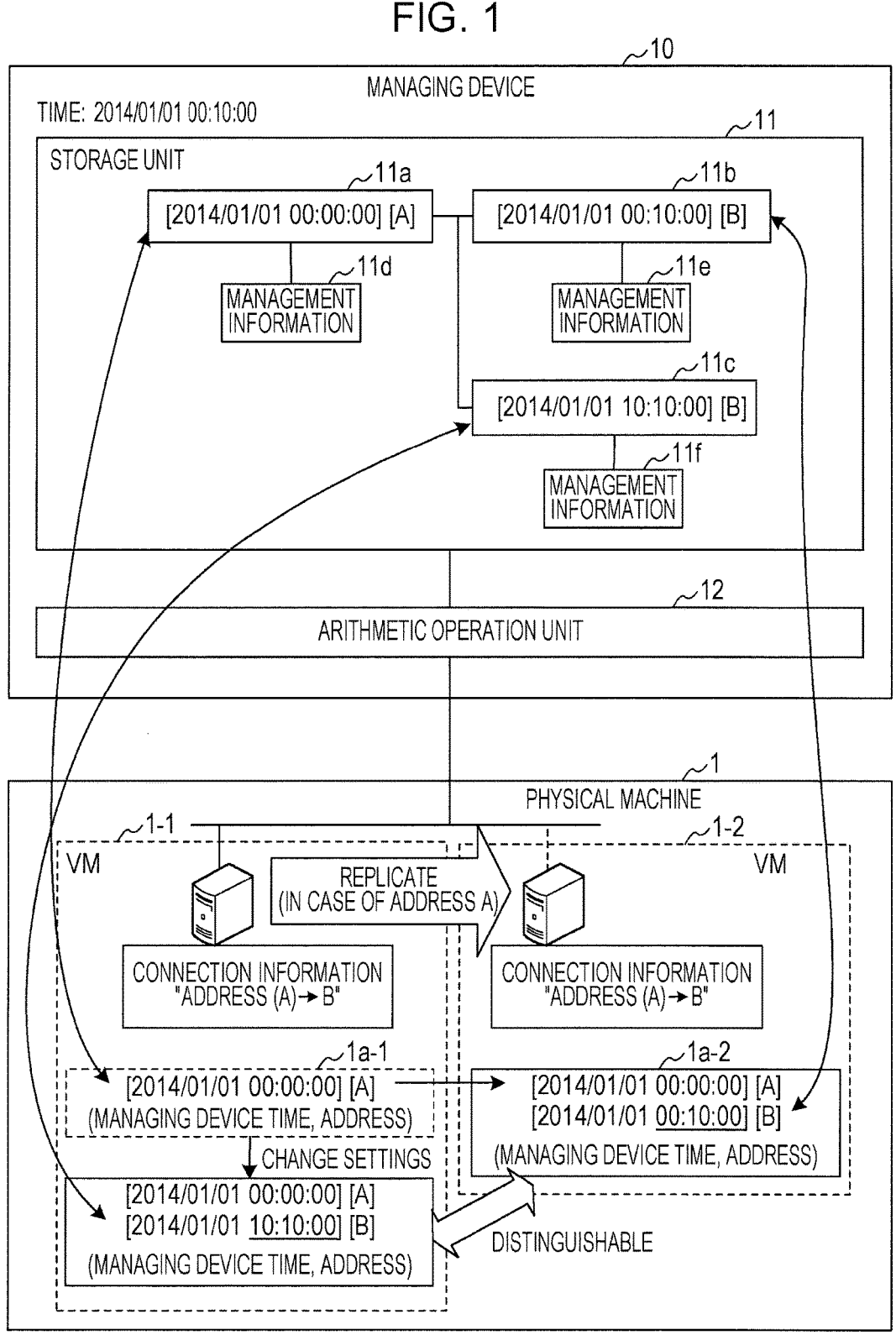
FIG. 1 is a diagram illustrating an example of structure of a system, according to an embodiment.

FIG. 1 is a diagram depicting an example of structure of a system according to a first embodiment. A managing device 10 is connected to a physical machine 1, which executes virtual machines (VMs) 1-1 and 1-2, via a network. The managing device 10 includes a storage unit 11 and an arithmetic operation unit 12 to manage the plurality of VMs 1-1 and 1-2.

The storage unit 11 stores identification information 11a to 11c of the VMs 1-1 and 1-2, and management information 11d to 11f of the VMs 1-1 and 1-2. The identification information 11a to 11c are each generated based on an internal time of the managing device 10. The identification information 11a to 11c each include, for example, connection information indicating settings for network connection, such as a corresponding VM address. The connection information represents, for example, an address for uniquely identifying the VM on the network. The management information 11d to 11f each include, for example, settings regarding a VM monitoring method.

The arithmetic operation unit 12 monitors the VMs 1-1 and 1-2, and, when detecting a VM which does not have stored therein identification information based on the internal time, causes identification information based on an internal time of the managing device 10 at the time of detection, to be stored in the VM. For example, the VMs 1-1 and 1-2 store one or more pieces of identification information as history information 1a-1 and 1a-2, respectively.

When the VM 1-1 is not a replica of another VM but is newly created, the VM 1-1 does not have the history information 1a-1 at the time of creation. When the arithmetic operation unit 12 detects the VM 1-1 as described above, the arithmetic operation unit 12 generates the identification information 11a based on the time at the time detection, and causes the history information 1a-1 including the identification information 11a to be stored in the VM 1-1. Here, the arithmetic operation unit 12 stores, in the storage unit 11, the identification information 11a stored in the VM 1-1, and also stores the management information 11d for management of the VM 1-1 in the storage unit 11 in association with the identification information 11a.

Also, when the arithmetic operation unit 12 detects a VM which has already stored therein identification information and whose settings regarding network connection have been changed after storage of the identification information, the arithmetic operation unit 12 causes identification information based on an internal time of the managing device 10 at the time of detection to be stored in the VM. For determination as to whether settings regarding network connection have been changed, the identification information stored in the VM may be used. For example, when causing the identification information to be stored in the VM, the arithmetic operation unit 12 causes the connection information indicating settings of that VM regarding network connection to be included in the identification information. Then, the arithmetic operation unit 12 detects a VM in which the connection information included in the stored identification information is different from current settings regarding network connection.

For example, it is assumed that the address of the VM 1-2 replicated from the VM 1-1 is changed and the VM 1-2 is then started. Here, the VM 1-2 has already stored therein identification information, and the address has been changed. Thus, the arithmetic operation unit 12 detects the VM 1-2, generates new identification information 11b based on an internal time of the managing device 10 at the time of detection, and causes the identification information 11b to be stored in the VM 1-2. The VM 1-2 adds the identification information 11b to the history information 1a-2. Here, the arithmetic operation unit 12 stores, in the storage unit 11, the identification information 11b stored in the VM 1-2, and also stores the management information lie for management of the VM 1-2 in the storage unit 11 in association with the identification information 11b.

By referring to the history information 1a-2 of the VM 1-2, it is found that the address is changed by transferring the configuration of the VM 1-1. Thus, the arithmetic operation unit 12 may take a replica of the management information 11d for management of the VM 1-1 as the management information lie for management of the VM 1-2.

Also, the address of the VM 1-1 may be changed. In the example of FIG. 1, two VMs 1-1 and 1-2 have the same address. In this case, while one of the VMs 1-1 and 1-2 is operating, the other stops. When the VM 1-1 with the address changed is started, the arithmetic operation unit 12 detects the VM 1-1, generates new identification information 11c based on an internal time of the managing device 10 at the time of detection, and causes the identification information 11c to be stored in the VM 1-1. The VM 1-1 adds the identification information 11c to the history information 1a-1. Here, the arithmetic operation unit 12 stores, in the storage unit 11, the identification information 11c stored in the VM 1-1, and stores, in the storage unit 11, the management information 11f for management of the VM 1-1 in association with the identification information 11c. Here, the arithmetic operation unit 12 may take a replica of the management information 11d for management of the VM 1-1 before address change, as the management information 11f for management of the VM 1-1 after address change.

Based on the identification information stored in the VMs 1-1 and 1-2, the arithmetic operation unit 12 identifies each of the VMs 1-1 and 1-2. For example, while two VMs 1-1 and 1-2 have the same address in the example of FIG. 1, the VM 1-1 and the VM 1-2 are distinguishable based on the difference in identification information.

The arithmetic operation unit 12 may also determine whether the VM 1-1 and the VM 1-2 with an address "B" are each a replica of the VM 1-1 or one with the address of the VM 1-1 changed. For example, when connectable to a VM identified based on the identification information stored in that VM at the time of detection of the VM, the arithmetic operation unit 12 determines that the detected VM is a replica of the identified VM. When unconnectable to a VM identified based on the identification information stored in that VM at the time of detection of the VM, the arithmetic operation unit 12 determines that the detected VM is the identified VM with settings regarding network connection changed.

For example, when the VM 1-2 with the address changed to "B" is started, if connectable to the VM 1-1 with an address "A", the VM 1-2 may be determined as a replica of the VM 1-1. Also, when the VM 1-1 with the address changed to "B" is started, no VM with the address "A" is present and the management device 10 is not connectable to such a VM. Therefore, the VM 1-1 with the address "B" may be determined as one with address setting simply changed.

In this manner, since identification information based on the internal time of the managing device 10 is stored in the VMs 1-1 and 1-2, and the VMs 1-1 and 1-2 are identified based on the identification information, each of the VMs 1-1 and 1-2 may be appropriately identified even when addresses of the VMs 1-1 and 1-2 overlap each other. Furthermore, even if a VM is replicated, the VM is provided with new identification information when the address of the VM obtained by replication is changed and the VM is started. Therefore, a replication source VM and a VM obtained by replication are clearly distinguishable from each other. Still further, depending on the presence or absence of a replication source VM, it is possible to discriminate between a VM obtained by replication of the replication source VM and a VM obtained by only changing the settings of the VM, such as an address.

Still further, since the management information 11e of the VM 1-2 obtained by replication may be created by replicating the management information 11d of the replication source VM 1-1, a work of creating the management information 11e is reduced. For example, when VM monitoring settings are included in the management information 11d, a work of registering the monitoring settings for the VM 1-2 obtained by replication in the management information 11e is omitted.

Still further, since the identification information is generated based on the internal time of the managing device 10, a coincidental match of pieces of identification information provided to different VMs does not occur.

Note that when the identification information is stored in the VM, an ID for identifying the managing device 10 (device identification information) may be included in the identification information. With the ID of the managing device 10 included in the identification information, a coincidental match of pieces of identification information may be inhibited even if a VM is relocated among a plurality of networks individually managed by a plurality of managing devices.

The arithmetic operation unit 12 may be implemented by, for example, a processor of the managing device 10. Also, the storage device 11 may be implemented by, for example, a memory of the managing device 10.

Second Embodiment

Next, a second embodiment is described. In the second embodiment, when infrastructure as a service (IaaS) is provided as a cloud, each VM is continuously and uniquely specified by a monitoring server which monitors VMs. For example, even if the MAC address of a VM is changed, that VM is specified as the same VM as previously specified.

First, difficulty in continuously and uniquely specifying a VM is described.

Conventionally, connection information for connecting a VM to a network is unique fixed information. The connection information includes an IP address, MAC address, host name, and so forth. Therefore, the connection information is set without redundancy at the time of designing an operation system. Therefore, it is possible to manage servers by distinguishing the servers with the connection information taken as a key. However, in a cloud environment, connection information is made temporarily. For example, connection information assigned to a server may be released by stopping that server, and the released connection information may be assigned to an entirely different server. Also, a VM is easily replicated. When a VM is replicated, the connection information is also replicated.

Figure 2:
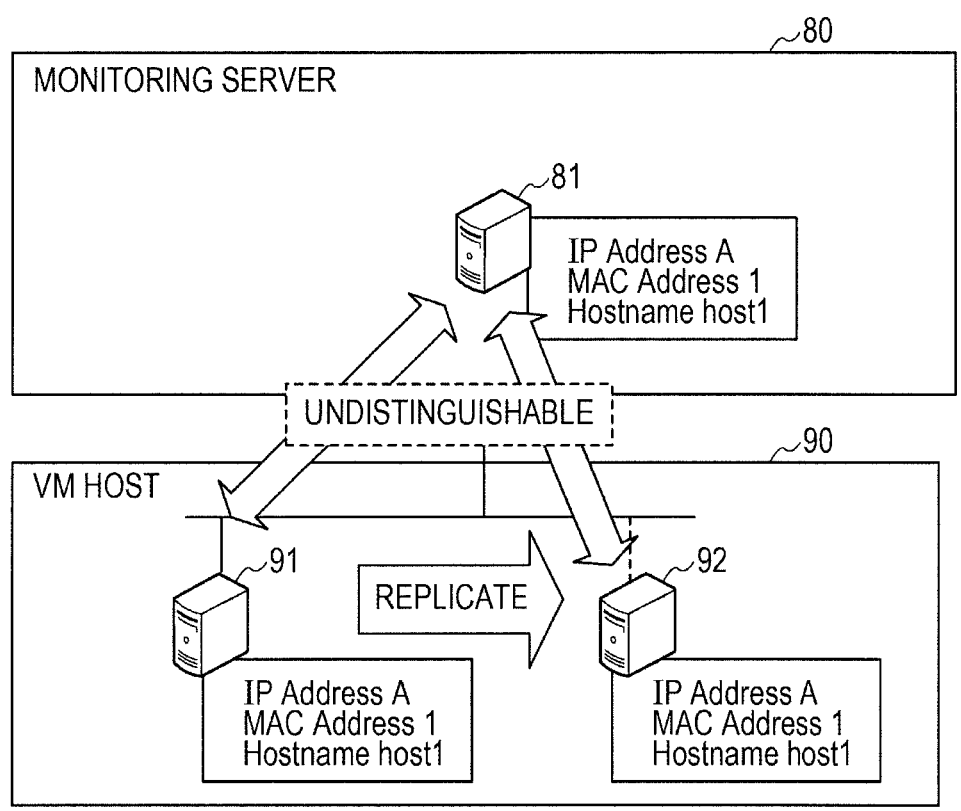
FIG. 2 is a diagram illustrating an example of a case where a virtual machine (VM) is replicated, according to an embodiment.

FIG. 2 is a diagram depicting an example when a VM is replicated. A monitoring server 80 monitors a VM operating in a VM host 90 via a network. In the example of FIG. 2, the monitoring server 80 takes a VM 91 as a monitoring target, and retains node management information 81 of the VM 91. The node management information 81 includes connection information, such as an IP address, MAC address, and host name. Also, the node management information 81 includes setting information indicating details of VM monitoring.

The VM host 90 may replicate the operating VM 91 to create another VM 92. Immediately after creation of the VM 92, the connection information of the VM 92 is the same as that of the VM 91. Therefore, when the VM 91 stops and the VM 92 starts, the monitoring server 80 is unable to recognize that the VM 92 is different from the previously-operating VM 91, even if checking against the node management information 81.

Also, in VM operation, for a currently-operating VM, a previous state stored as a snapshot may be reproduced by another VM. Also in this case, redundancy of connection information occurs between or among a plurality of VMs.

In this manner, in a cloud environment, redundancy of connection information for network connection between or among VMs often occur due to replication of VMs, return of a snapshot, and the like, thereby making it difficult for the monitoring server to distinguish individual VMs.

The monitoring server 80 may be configured such that, when the VM 92 obtained by replication is started with another connection information while the replication source VM 91 is being operated, the monitoring server 80 recognizes that the VM 92 is different from the VM 91. However, if this configuration is adopted, when the connection information of the VM 91 is changed, the VM is recognized as being entirely different from the VM 91.

Figure 3:
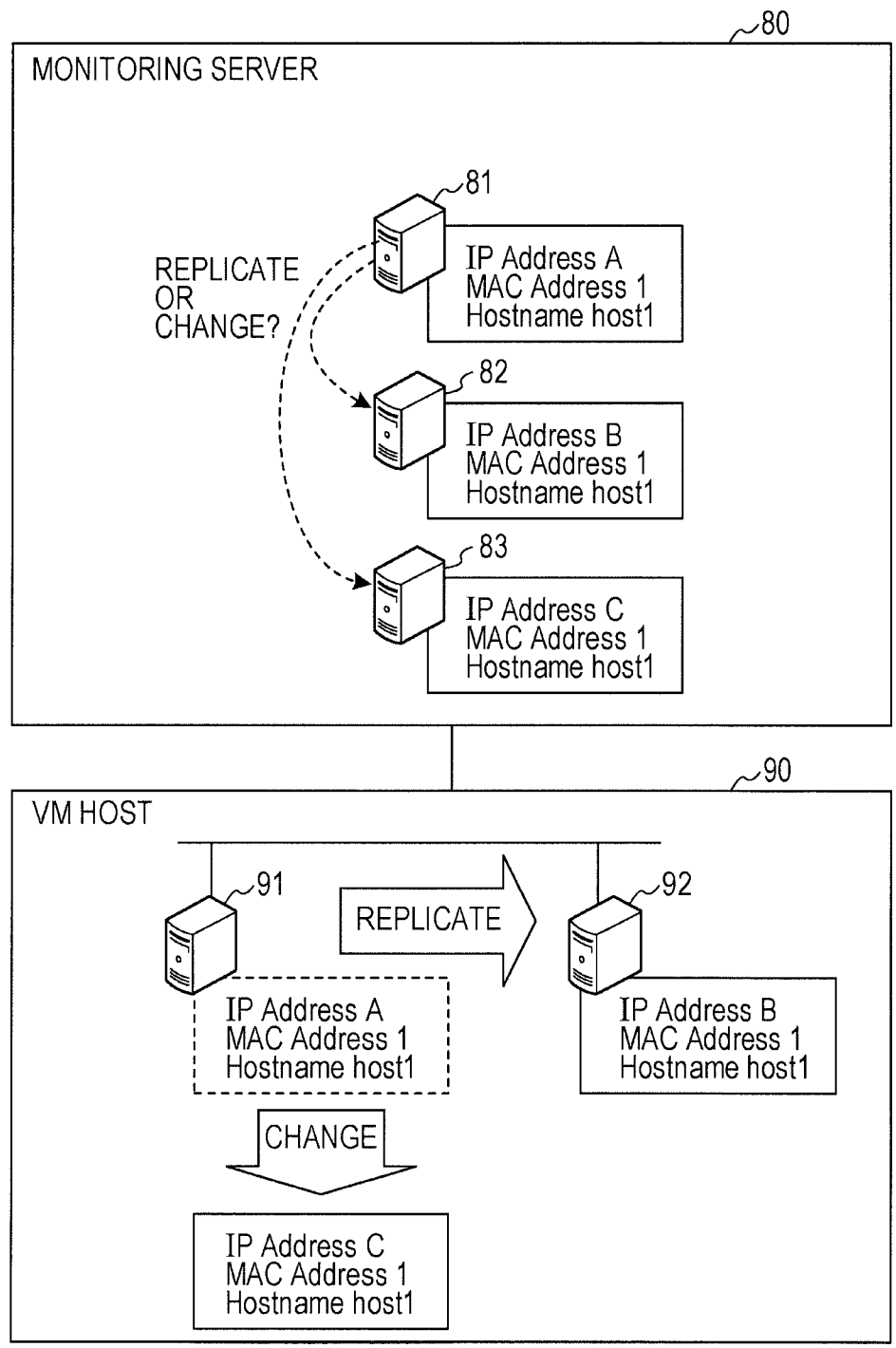
FIG. 3 is a diagram illustrating an example of a case where VM replication and change of connection information are performed, according to an embodiment.

FIG. 3 is a diagram depicting an example when VM replication and change of connection information are performed. In the example of FIG. 3, the VM 91 has an IP address "A", but the IP address of the VM 92 obtained by replication is "B". Since the VM 92 has the IP address different from that of the VM 91, the monitoring server 80 generates node management information 82 different from the node management information 81 corresponding to the VM 91. Then, when the IP address of the VM 91 is changed to "C", the VM 91 has the IP address different from the previous IP address, and therefore the monitoring server 80 generates new node management information 83 corresponding to the VM 91.

The node management information 81 to 83 include setting values for monitoring items for monitoring the VMs 91 and 92. When it is found that the newly detected VM 92 is a replica of the VM 91, the node management information 81 of the VM 91 is copied to generate the node management information 82, thereby allowing a setting work for monitoring to be omitted. However, in the conventional technology, the monitoring server 80 is unable to recognize that the VM 92 is a replica of the VM 91.

Similarly, if it is found that the VM 91 newly detected as having an IP address of "C" is the VM 91 corresponding to the node management information 81 whose IP address has been changed, the process of generating the node management information 83 may be made efficient. However, in the conventional technology, when detecting the VM 91 with the IP address "C", the monitoring server 80 is unable to recognize that merely the IP address of the VM 91 has been changed.

Moreover, for example, when the MAC addresses are the same, it may also be determined that the VM 91 newly detected as having the IP address "C" is a VM obtained by replication or a VM with settings changed. In this case, however, the VM 92 after replication and the VM 91 after setting change are not distinguishable.

Here, the VMs 91 and 92 without having unique fixed information may be differentiated by using information that is changed with a change of time at which each of the VMs 91 and 92 performs predetermined processing. For example, the time of connection from the monitoring server 80 to each of the VMs 91 and 92 may be used as identification information for each of the VMs 91 and 92.

Figure 4:
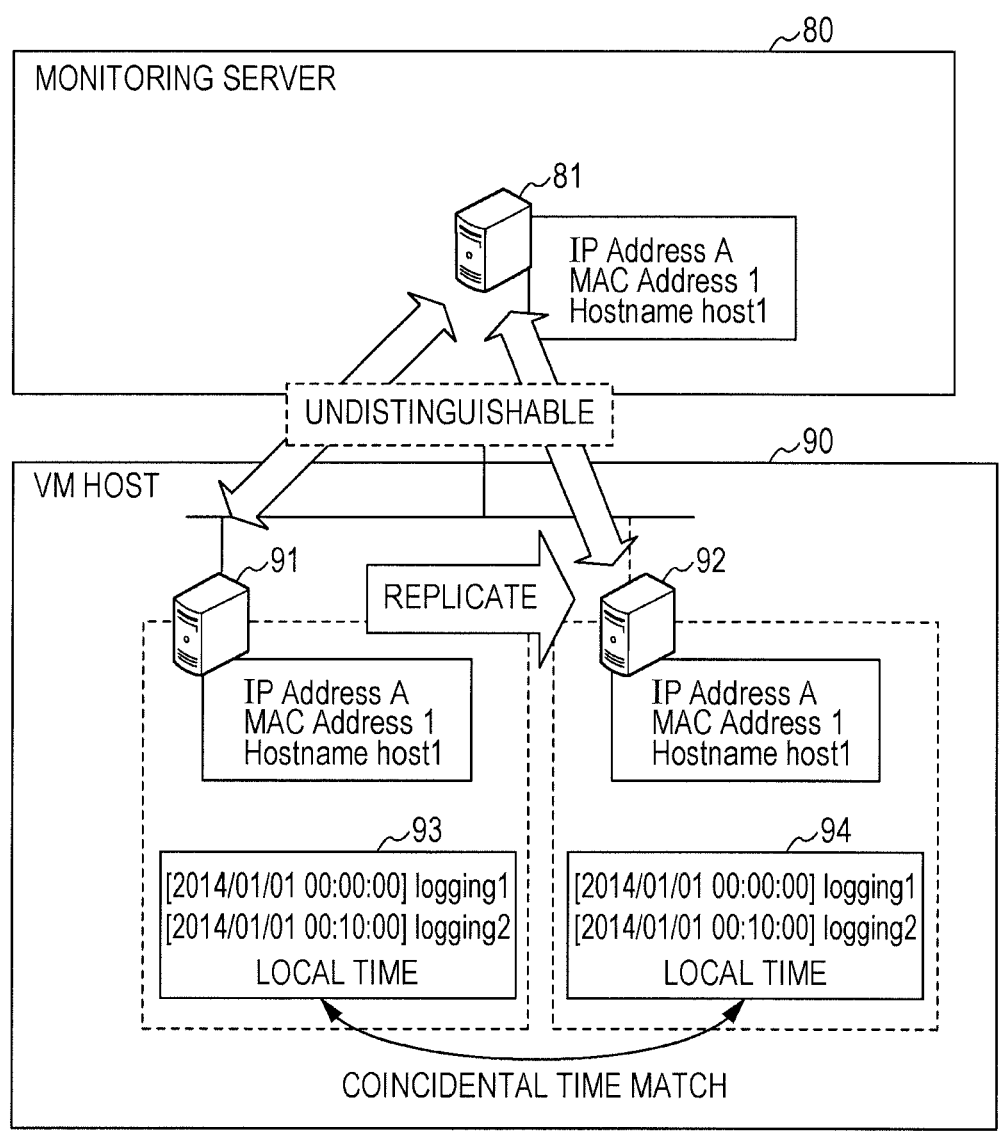
FIG. 4 is a diagram illustrating an example of a case where VMs are identified using time, according to an embodiment.

FIG. 4 is a diagram depicting an example of identification of the VMs using time. The VMs 91 and 92 retain connection history information 93 and 94, respectively. When connected from the monitoring server 80, the VMs 91 and 92 store local times of the VMs 91 and 92 in the connection history information 93 and 94, respectively. When the stored times are different from each other, the VM 91 and the VM 92 are distinguishable based on the connection history information 93 and 94.

However, the local times of the VMs 91 and 92 may coincidentally become the same. For example, in general, the time stops when the VM stops, and the time is corrected when the VM starts. Therefore, an erroneous time may be obtained depending on timing, and there is a possibility that overlapped connection history information is generated. Therefore, the VMs are not necessarily perfectly identifiable even by using the connection history information 93 and 94.

Thus, in the second embodiment, the time obtained by an internal clock of the monitoring server 80 is used for VM identification. With this, a coincidental match of the times stored in the respective pieces of connection history information of the plurality of VMs 91 and 92 is inhibited, and the VM 91 and the VM 92 are reliably distinguishable.

Figure 5:
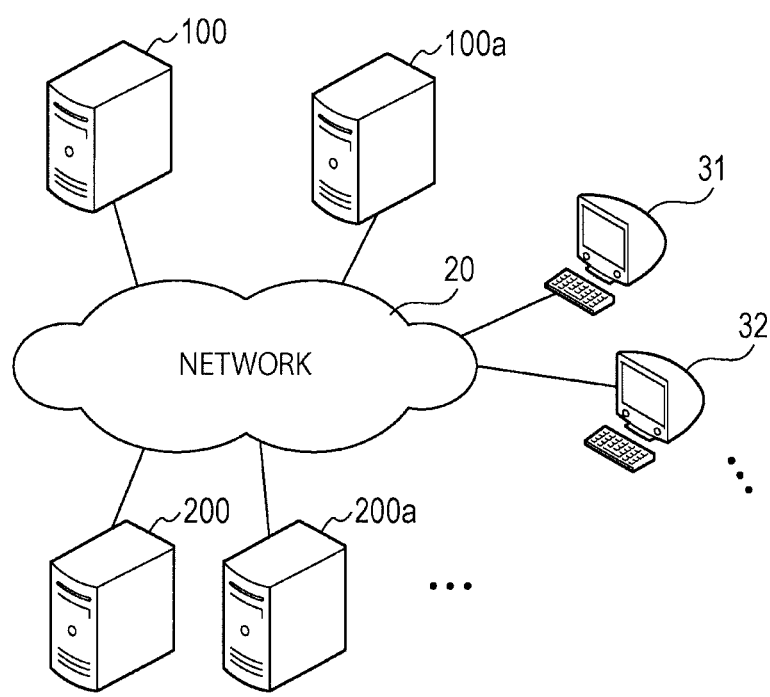
FIG. 5 is a diagram illustrating an example of a configuration of a system, according to an embodiment.

FIG. 5 is a diagram depicting an example of structure of a system of the second embodiment. A plurality of monitoring servers 100 and 100a are connected to a plurality of VM hosts 200, 200a, . . . via a network 20. Also, to the network 20, a plurality of terminal devices 31, 32, . . . are connected.

The VM hosts 200, 200a, . . . are computers which each internally cause a VM to operate and provide a service using the VM. The monitoring servers 100 and 100a are computers which monitor VMs operating in the VM hosts 200, 200a, . . . . The terminal devices 31, 32, . . . are computers which access the VMs to use the service. Via the monitoring servers 100 and 100a, users of the terminal devices 31, 32, . . . each monitor the state of the VM being used by the user.

The monitoring servers 100 and 100a depicted in FIG. 5 are an example of the managing device 10 in the first embodiment depicted in FIG. 1. Also, the VM hosts 200, 200a, . . . depicted in FIG. 5 are an example of the physical machine 1 in the first embodiment depicted in FIG. 1.

Figure 6:
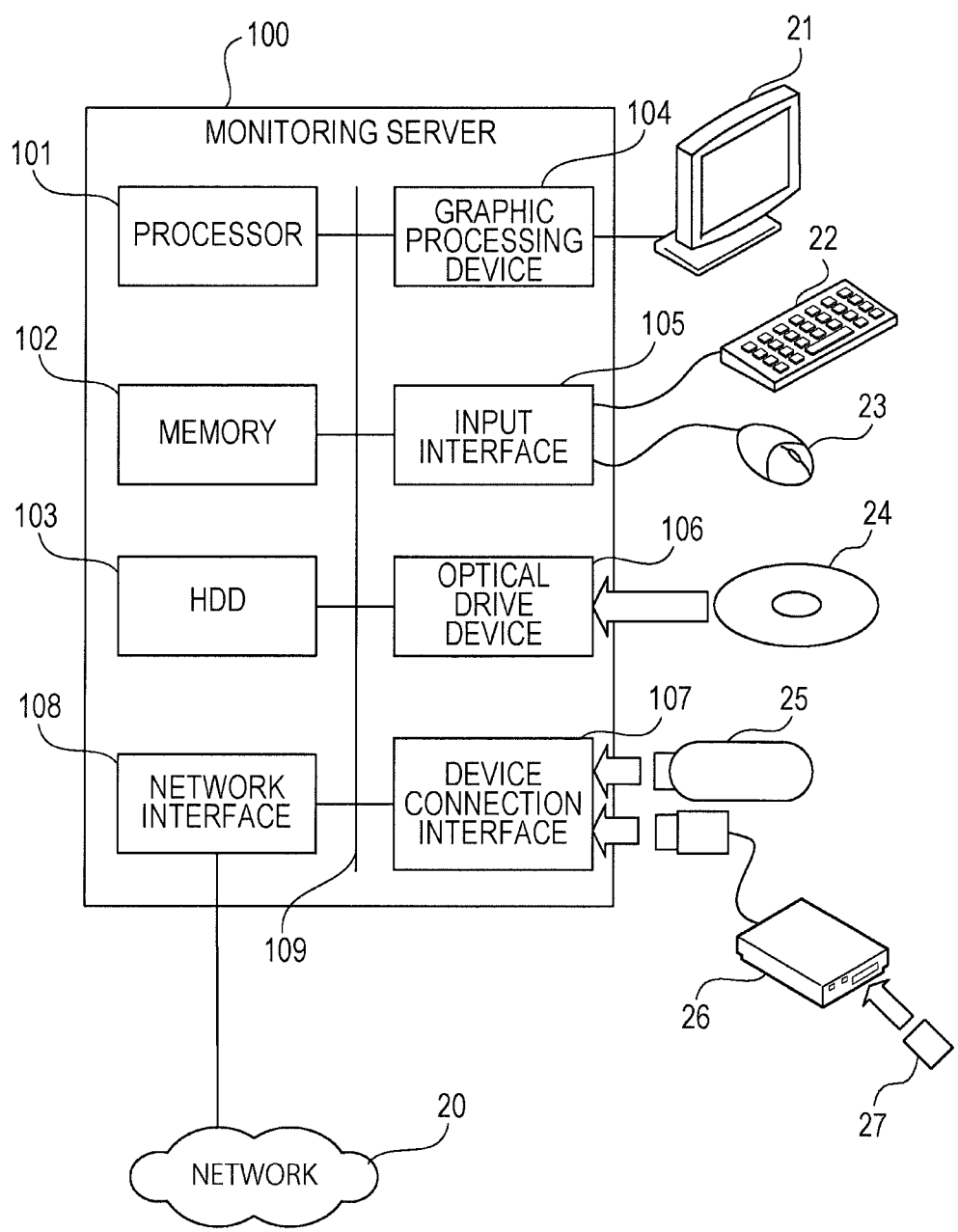
FIG. 6 is a diagram illustrating an example of a hardware configuration of a monitoring server, according to an embodiment.

FIG. 6 is a diagram depicting an example of structure of hardware of a monitoring server for use in the second embodiment. The entire monitoring server 100 is controlled by a processor 101. To the processor 101, a memory 102 and a plurality of peripheral devices are connected via a bus 109. The processor 101 may be a multiprocessor. The processor 101 is, for example, a central processing unit (CPU), micro processing unit (MPU), or digital signal processor (DSP). At least part of functions achieved by the processor 101 executing a program may be implemented by an electronic circuit such as an application specific integrated circuit (ASIC) or programmable logic device (PLD).

The memory 102 is used as a main storage device of the monitoring server 100. In the memory 102, at least part of an OS program and application program to be executed by the processor 101 is temporarily stored. Also in the memory 102, various data for use in process by the processor 101 are stored. As the memory 102, for example, a volatile semiconductor storage device such as a random access memory (RAM) is used.

Examples of the peripheral devices connected to the bus 109 include a hard disk drive (HDD) 103, a graphic processing device 104, an input interface 105, an optical drive device 106, a device connection interface 107, and a network interface 108.

The HDD 103 magnetically writes and reads data to and from a disk incorporated therein. The HDD 103 is used as an auxiliary storage device of the monitoring server 100. In the HDD 103, an OS program, application program, and various data are stored. As an auxiliary storage device, a non-volatile semiconductor storage device (a solid state drive (SSD)), such as a flash memory, may also be used.

To the graphic processing device 104, a monitor 21 is connected. By following an instruction from the processor 101, the graphic processing device 104 causes an image to be displayed on a screen of the monitor 21. Examples of the monitor 21 include a display device and liquid-crystal display device using a cathode ray tube (CRT).

To the input interface 105, a keyboard 22 and a mouse 23 are connected. The input interface 105 transmits a signal sent from the keyboard 22 or the mouse 23 to the processor 101. The mouse 23 is an example of a pointing device, and another pointing device, for example, a touch panel, tablet, touchpad, or trackball, may be used.

The optical drive device 106 uses laser light or the like to read data recorded on an optical disk 24. The optical disk 24 is a portable recording medium having data recorded readably by reflection of light. Examples of the optical disk 24 include a digital versatile disc (DVD), DVD-RAM, compact disc read only memory (CD-ROM), and CD-recordable/rewritable (CD-R/RW).

The device connection interface 107 is a communication interface for connecting the peripheral devices to the monitoring server 100. For example, to the device connection interface 107, a memory device 25 and a memory reader/writer 26 may be connected. The memory device 25 is a recording medium equipped with a function of communication with the device connection interface 107. The memory reader/writer 26 is a device which writes data to the memory card 27 or reads data from the memory card 27. The memory card 27 is a card-shaped recording medium.

The network interface 108 is connected to the network 20. The network interface 108 transmits and receives data to and from another computer or communication device via the network 20.

With the above-described hardware structure, processing functions of the second embodiment may be achieved. While the hardware structure of the monitoring server 100 is depicted in FIG. 6, the monitoring server 100*a*, the VM hosts 200, 200*a*, . . . , and the terminal devices 31, 32, . . . may also be implemented by hardware similar to that of the monitoring server 100. Furthermore, the managing device 10 and the physical machine 1 described in the first embodiment may also be implemented by hardware similar to that of the monitoring server 100 depicted in FIG. 6.

For example, by executing a program recorded on a computer readable recording medium, the monitoring server 100 achieves the processing functions of the second embodiment. A program having written therein process details to be executed by the monitoring server 100 may be recorded on any of various recording media. For example, the program to be executed by the monitoring server 100 may be stored in the HDD 103. The processor 101 loads at least part of the program in the HDD 103 to the memory 102 and executes the program. Also, the program to be executed by the monitoring server 100 may also be recorded on a portable recording medium, such as the optical disk 24, the memory device 25, or the memory card 27. The program stored in the portable recording medium is installed in the HDD 103 under the control from, for example, the processor 101, and then becomes executable. Furthermore, the processor 101 may read the program directly from the portable recording medium for execution.

Figure 7:
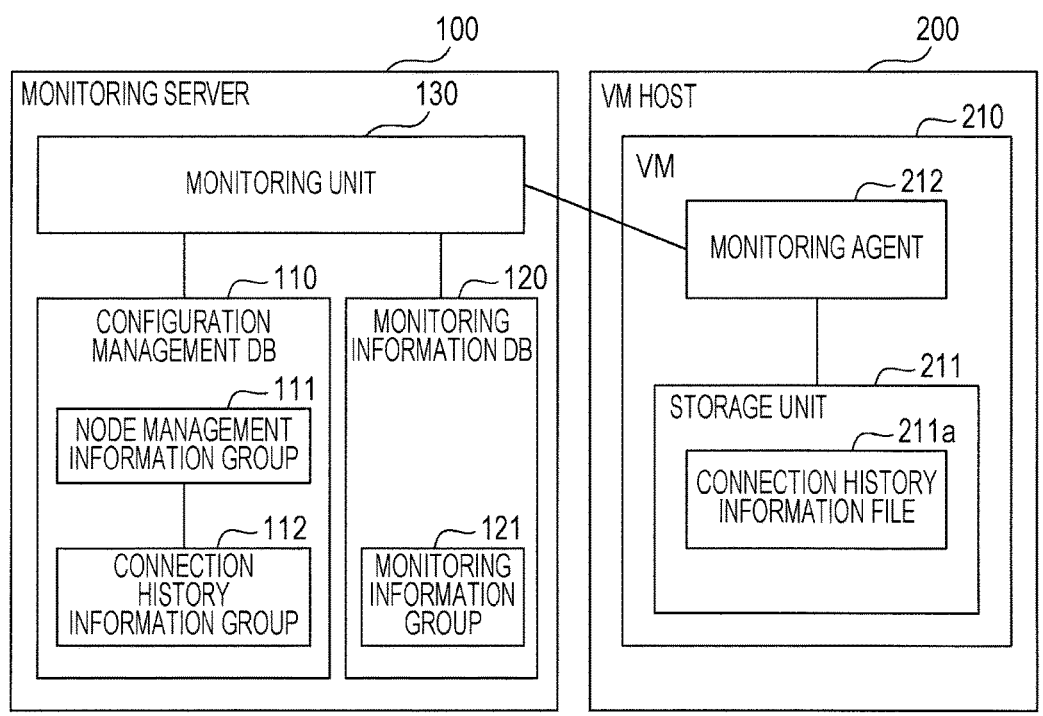
FIG. 7 is a diagram illustrating an example of functions of a monitoring server and a VM host, according to an embodiment.

FIG. 7 is a block diagram depicting functions of the monitoring server and the VM host. The monitoring server 100 includes a configuration management database (DB) 110, a monitoring information DB 120, and a monitoring unit 130.

The configuration management DB 110 is a DB for managing the configuration of the respective VMs operating in the VM hosts 200, 200*a*, . . . . The configuration management DB 110 includes, for example, a node management information group 111 and a connection history information group 112. The node management information group 111 is a collection of pieces of node management information provided for the respective VMs. The node management information includes information such as connection information and monitoring settings of a corresponding VM. The connection history information group 112 is a collection of pieces of connection history information representing history of connection from the monitoring server 100 to the respective VMs. The connection history information includes a connection time.

The monitoring information DB 120 is a DB for managing results of monitoring the respective VMs operating in the VM hosts 200, 200*a*, . . . . The monitoring information DB 120 includes a monitoring information group 121. The monitoring information group 121 is a collection of pieces of monitoring information such as events occurring in the VMs.

The monitoring unit 130 monitors the VM 210 operating in the VM host 200. For example, the monitoring unit 130 connects to the VM 210 at regular intervals to update information regarding the VM 210 in the configuration management DB 110. Also, the monitoring unit 130 obtains information such as an event occurring in the VM 210, and stores the information in the monitoring information DB 120.

The VM host 200 may newly create, replicate, and delete the VM 210, and may save and restore the VM 210 by using a snapshot. The VM 210 includes a storage unit 211 and a monitoring agent 212. The storage unit 211 stores a connection history information file 211*a*. The connection history information file 211*a* is a file for storing connection history information received from the monitoring server 100. The connection history information includes a time sent from the monitoring server 100 as identification information.

The monitoring agent 212 cooperates with the monitoring unit 130 of the monitoring server 100 to support monitoring of the VM 210 by the monitoring unit 130. For example, the monitoring agent 212 monitors the VM 210, detects an event such as an anomaly of the system or business operation application, and notifies the monitoring unit 130 of monitoring information indicating details of the event. Also, in response to a request from the monitoring unit 130, the monitoring agent 212 transmits the connection history information in the connection history information file 211*a* to the monitoring unit 130. Furthermore, the monitoring agent 212 writes the connection history information sent from the monitoring unit 130 into the connection history information file 211*a*.

With the above-structured system, the plurality of VMs are appropriately distinguished for VM monitoring. Note that lines connecting components depicted in FIG. 7 represent part of communication routes, and communication routes other than the depicted communication routes may be set. Also, the functions of the respective components depicted in FIG. 7 may be achieved by, for example, a computer executing a program module corresponding to each component.

In an IaaS cloud service, a user may operate the monitoring server 100 and the VM 210, but is not allowed to operate a hyperviser of the VM host 200. Therefore, on a network managed by the user, communications between the monitoring server 100 and the VM 210 and between the VM 210 and the VM host 200 may be performed, but no network is directly connected to the monitoring server 100 and the VM host 200, and therefore communication is not allowed therebetween.

Next, information for use in monitoring the VM 210 by the monitoring server 100 is described in detail.

Figure 8:
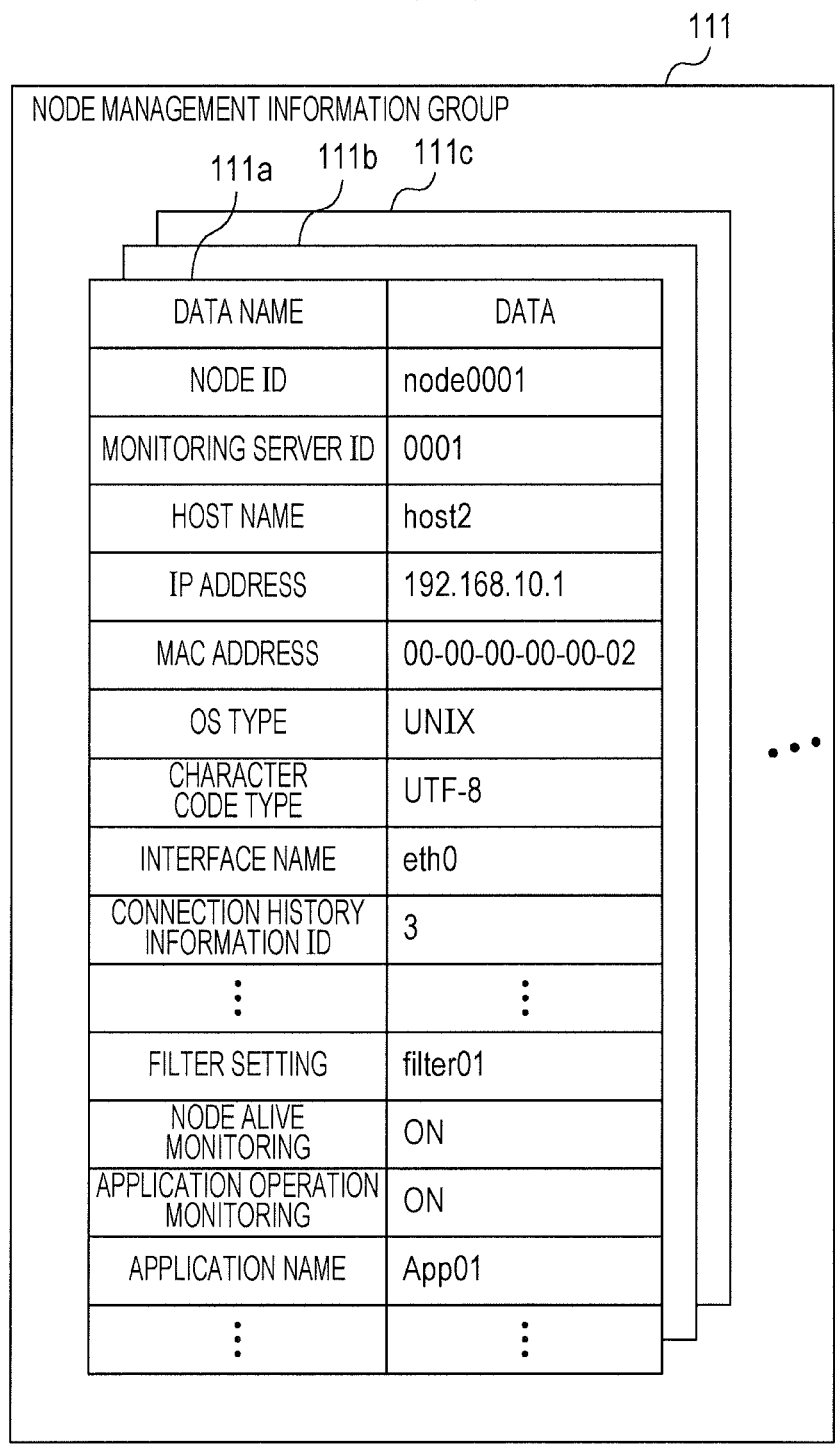
FIG. 8 is a diagram illustrating an example of node management information, according to an embodiment.

FIG. 8 is a diagram depicting an example of node management information. In node management information group 111, for example, pieces of VM information are managed with a plurality of pieces of node management information 111*a*, 111*b*, 111*c*, . . . in a data table format.

For example, in the node management information 111*a*, pieces of data are set, such as a node ID, monitoring server ID, host name, IP address, MAC address, OS type, character code type, interface name, connection history information ID, filter setting, node alive monitoring, application operation monitoring, and application name. The node ID data indicates identification information of a monitoring target VM. The monitoring server ID data indicates identification information of the monitoring server which monitors the VM. The host name data indicates a host name of the VM. The IP address data indicates an IP address set to the VM. The MAC address data indicates a MAC address set to the VM. The OS type data indicates a type of an OS operating in the VM. The character code type data indicates a type of character code being used by the VM. The interface name data indicates a device name of an interface being used by the VM for communication. The connection history information ID data indicates an identification number of corresponding connection history information. The filter setting data indicates a type of a filter to be set to the VM. The node alive monitoring data indicates whether a VM operating state is to be monitored. The application operation monitoring data indicates whether an operating state of application software introduced to the VM is to be monitored. The application name data indicates the name of the application software introduced to the VM.

FIG. 9 is a diagram depicting an example of connection history information. In the connection history information group 112, the connection history information is managed with, for example, a connection history information table 112a. The connection history information table 112a is a data table having each piece of connection history information as an entry. The connection history information table 112a is provided with sections of an ID, monitoring server ID, date and time of update, IP address, MAC address, host name, and immediately preceding history ID.

In the ID section, an identification number of connection history information is set. In the monitoring server ID section, identification information of a monitoring server generating the connection history information is set. In the date and time of update section, a time in the monitoring server at which the connection history information is generated is set. In the IP address section, an IP address of the VM at the time of generation of the connection history information is set. In the MAC address section, a MAC address of the VM at the time of generation of the connection history information is set. In the host name section, a host name of the VM at the time of generation of the connection history information is set. The immediately preceding history ID section, an identification number of the latest connection history information that the VM provided with relevant connection history information has ever had.

The pieces of connection history information registered in the connection history information table 112a are associated with each other by the immediately preceding history ID. A relation among connection histories is represented as a tree structure.

Figure 10:
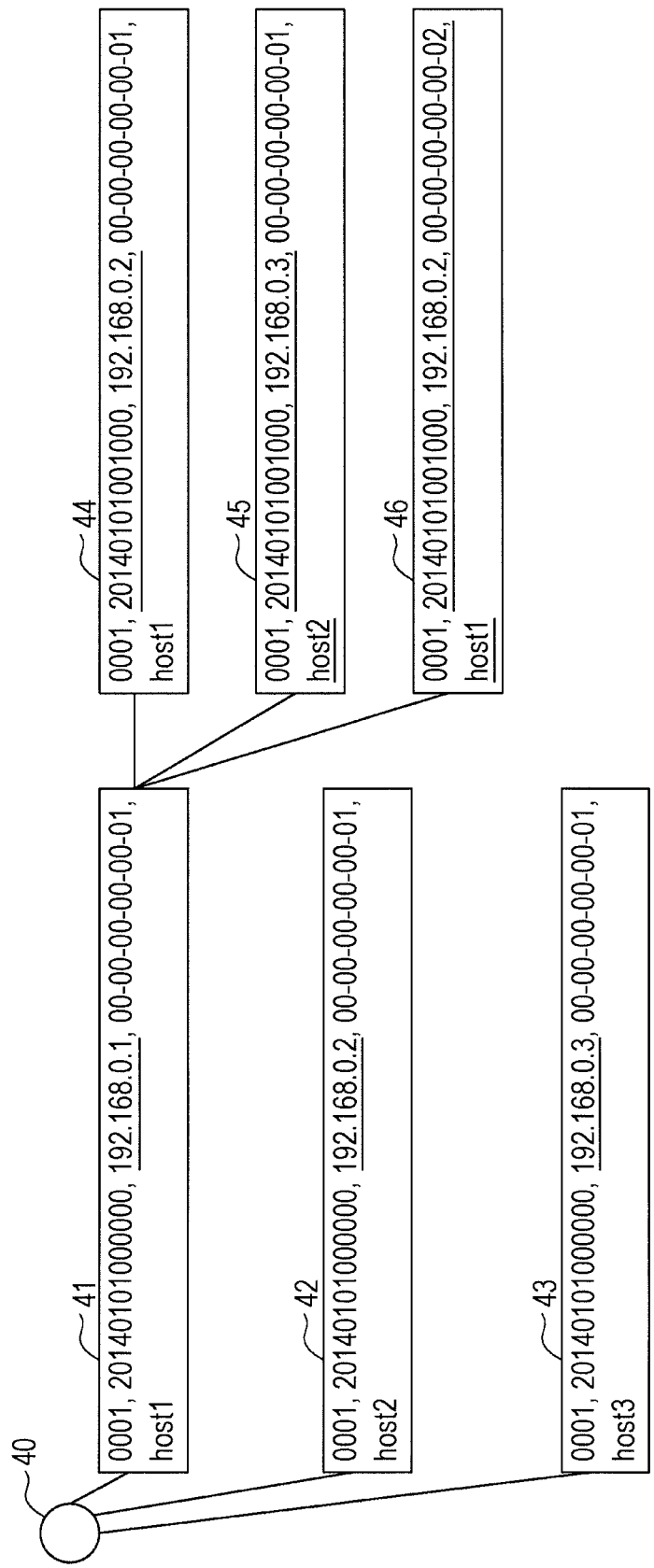
FIG. 10 is a diagram illustrating an example of a tree structure representing a relation among connection histories, according to an embodiment.

FIG. 10 is a diagram depicting a tree structure representing a relation among connection histories. Under a starting point 40, connection history information 41 to 43 each having no value set in the immediately preceding history ID section are connected in the connection history information table 112a. Under the connection history information 41, connection history information 44 to 46 each having an ID of connection history set in the immediately preceding history ID section are connected. In this manner, the connection history information is represented as a tree structure based on the value of the immediately preceding history ID.

FIG. 11 is a diagram depicting an example of monitoring information. In the monitoring information group 121, monitoring information obtained as a result of monitoring is managed with, for example, a monitoring information table 121a. The monitoring information table 121a is provided with sections of an ID, type, date and time of occurrence, degree of importance, message text, node ID, and state.

In the ID section, an identification number of monitoring information is set. In the type section, a type of the monitoring information is set. In the date and time of occurrence section, a date and time of occurrence of the monitoring information is set. In the degree of importance section, a degree of importance of the monitoring information such as an event is set. In the message text section, a character string of a message describing the monitoring information is set. In the node ID section, a node ID of node management information corresponding to the monitoring target VM at the time of obtaining the monitoring information is set. In the state section, whether a problem indicated by the monitoring information has been resolved is set. In an initial state, "unresolved" is set, which is changed to "resolved" by an input from the user when the problem indicated by the monitoring information is resolved.

FIG. 12 is a diagram depicting an example of the connection history information file retained in the VM. On the connection history information file 211a, information about history of connection from the monitoring servers 100 and 100a to the VM 210 is recorded. On the connection history information, a monitoring server ID, date and time of update, IP address, MAC address, and host name are recorded sequentially from the head.

Next, VM monitoring process in the second embodiment is described. In the second embodiment, each VM is distinguishable even if, for example, a plurality of VMs having the same connection information are generated by replication.

Figure 13:
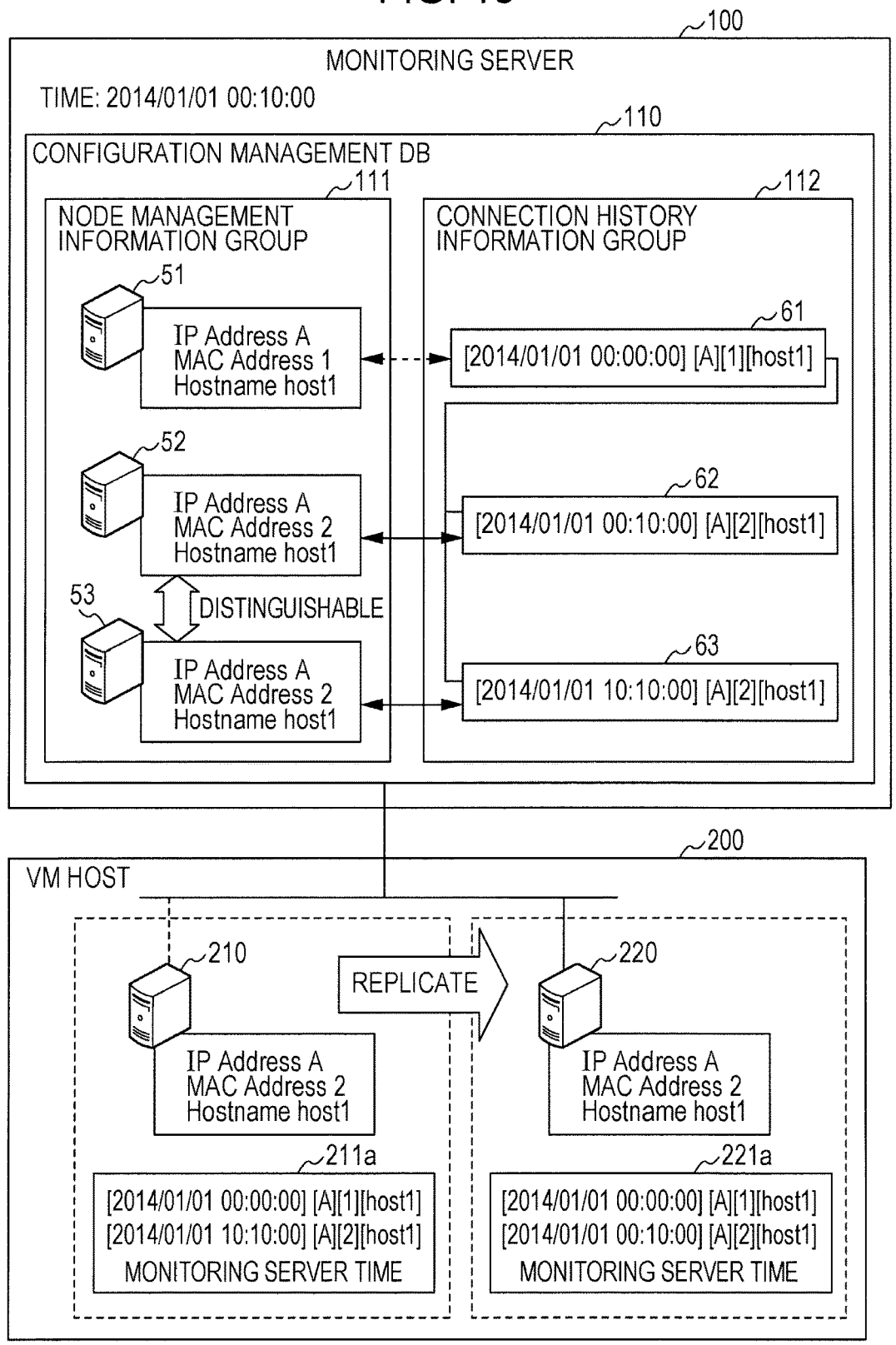
FIG. 13 is a diagram illustrating an example of a case where a VM obtained by replication is identified, according to an embodiment.

FIG. 13 is a diagram depicting an example of distinction of a VM obtained by replication. In the example of FIG. 13, a VM 220 is generated by replicating the VM 210 in the VM host 200. The VMs 210 and 220 have the same connection information (IP address, MAC address, and host name). Note that the VMs 210 and 220 that have the same connection information are not allowed to be simultaneously connected to a network. In the example of FIG. 13, it is assumed that the VM 210 is connected to the network at the time of generation of the VM 220, and the VM 210 is then stopped and the VM 220 with the MAC address changed from "1" to "2" is started. Furthermore, it is assumed that the VM 220 is then stopped and the VM 210 with the MAC address changed from "1" to "2" is started.

The start and stop of the VMs 210 and 220 in the VM host 200 as described above are monitored by the monitoring server 100. For example, the monitoring unit 130 of the monitoring server 100 receives connection information from the VM 210 before the VM 220 is generated. For the received network information, the monitoring unit 130 creates connection history information 61 added with a time of the monitoring server 100 and a unique monitoring server ID. For example, the connection history information 61 of "[2014/01/01 00:00:00] [A][1][host1]" is generated. In this connection history information 61, the date and time of update, IP address, MAC address, and host name are listed (in the example of FIG. 13, the monitoring server ID is omitted). The date and time of update included in the connection history information 61 is set based on the time of the internal clock of the monitoring server 100.

Upon generation of connection history information, the monitoring unit 130 causes node management information 51 corresponding to the VM 210 to be stored in the configuration management DB 110. The monitoring unit 130 also associates the generated connection history information 61 with the node management information 51, and causes the resultant information to be stored in the configuration management DB 110. The monitoring unit 130 further transmits the generated connection history information 61 to the VM 210. In the VM 210, the contents of the connection history information 61 are written in the connection history information file 211a.

Then, upon detecting a VM in which the connection information included in the connection history information and the current connection information do not match each other, the monitoring unit 130 newly generates node management information 52 and 53 and connection history information 62 and 63. Then, the monitoring unit 130 transmits the generated connection history information to the detected VMs 210 and 220 to cause the connection history information files 211a and 221a to be updated. With this, the replication source VM 210 and the VM 220 obtained by replication become distinguishable.

For example, when the VM 210 stops and the VM 220 replicated from the VM 210 with the MAC address changed to "2" is started, the monitoring unit 130 detects the VM 220. Then, the monitoring unit 130 obtains connection history information from the VM 220. Here, the obtained history information is "[2014/01/01 00:00:00] [A][1][host1]", and the MAC address does not match that of the VM 220. Thus, the node management information 52 and the connection history information 62 are generated and stored in the configuration management DB 110, and the connection history information 62 is written in the connection history information file 221a of the VM 220.

The replication source VM 210 is being operated when the VM 220 obtained by replication is started, and when it is confirmed by using the MAC address that the VM 210 is being operated, the monitoring server 100 may recognize that the VM 220 is a replica of the VM 210. In this case, in the monitoring server 100, for example, the fact that the VM 220 is a replica is stored as monitoring information in the monitoring information DB 120.

Then, when the VM 220 stops and the replication source VM 210 with the MAC address changed to "2" is started, the monitoring unit 130 detects the VM 210. Then, the monitoring unit 130 obtains history information from the VM 210. Here, the obtained history information is "[2014/01/01 00:00:00] [A][1][host1]", and the MAC address does not match that of the VM 210. Thus, the node management information 53 and the connection history information 63 are generated and stored in the configuration management DB 110, and the connection history information 63 is written in the connection history information file 211a of the VM 210.

When the VM 210 after the change of the MAC address is started, the monitoring server 100 confirming that no VM having connection information before the change of the MAC address is present may recognize that the MAC address of the VM 210 has been changed. In this case, in the monitoring server 100, for example, the fact that the MAC address of the VM 210 has been changed is stored as monitoring information in the monitoring information DB 120.

As depicted in FIG. 13, the connection history information recorded on the connection history information file 221a of the VM 220 obtained by replication and the connection history information recorded on the connection history information file 211a of the VM 210 with changed settings are different from each other. Therefore, it is possible to identify the VM 220 obtained by replication and the VM 210 with changed settings, by taking the connection history information as a key. Furthermore, by managing the connection history information group in a tree structure and associating each piece of connection history information configuring the tree structure with node management information, it is possible to distinguish each VM as a monitoring target, irrespectively of VM replication and change.

In this case, when new node management information is generated by replication from the existing VM 210 or change of settings of the connection information of the existing VM 210, the node management information 51 of the VM 210 is copied.

Figure 14:
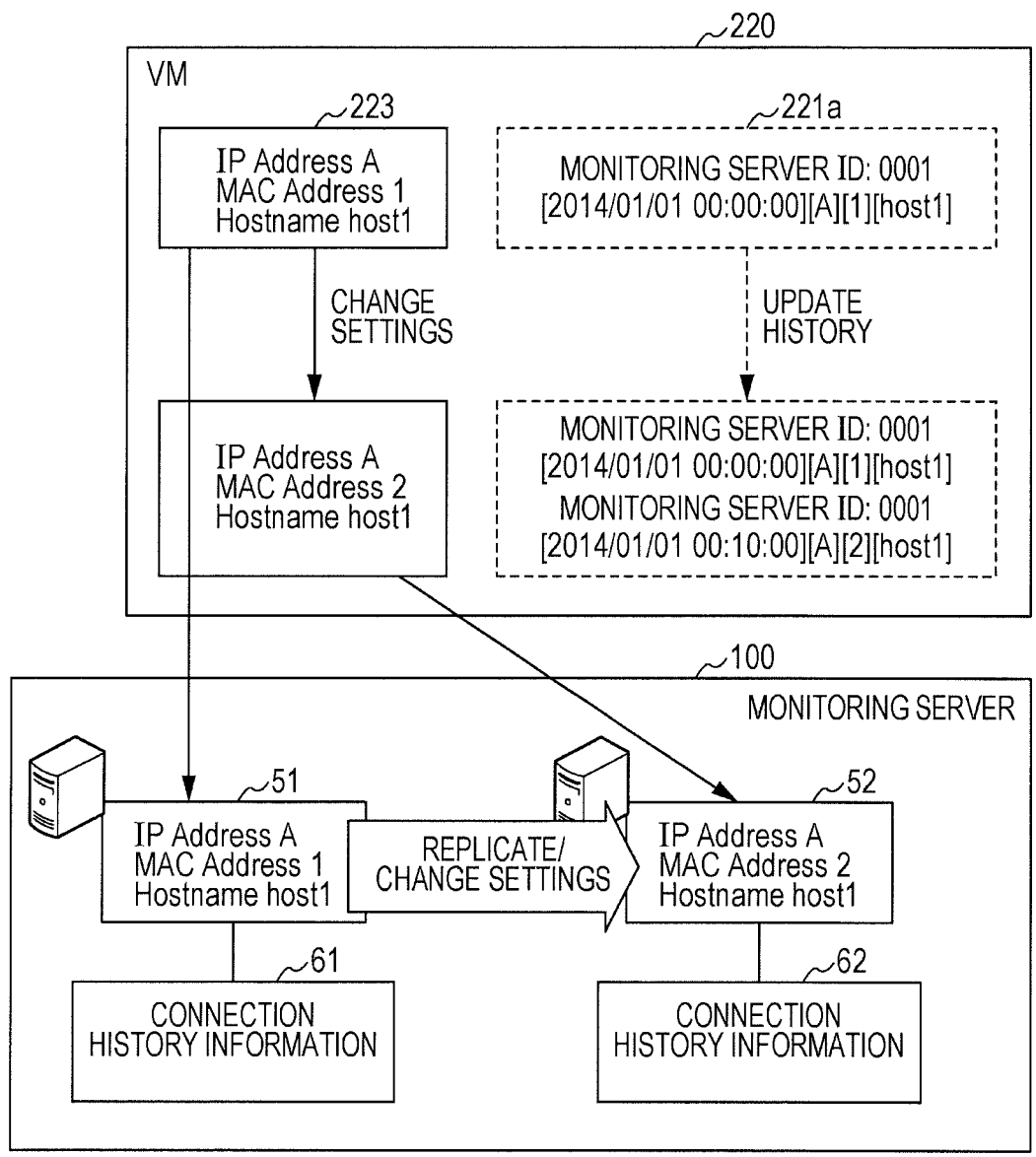
FIG. 14 is a diagram illustrating an example of a case where node management information is generated, according to an embodiment.

FIG. 14 is a diagram depicting an example of generation of node management information. When connection information 223 of the VM 220 obtained by replicating the VM 210 is changed, the monitoring server 100 detects that the contents of the connection history information file 221a match the connection history information 61 associated with the node management information 51 corresponding to the VM 210. Then, based on the node management information 51 of the VM 210, the monitoring server 100 generates node management information 52 corresponding to the VM 220. For example, the monitoring server 100 replicates the node management information 51 corresponding to the VM 210, and takes the one obtained by replication with the MAC address updated as the node management information 52.

The monitoring server 100 associates the newly-generated node management information 52 with the connection history information 62 including a time at which the monitoring server 100 has connected to the VM 220. The connection history information 62 is added to the connection history information file 221a of the VM 220.

Next, process of monitoring the VMs 210 and 220 by the monitoring server 100 is described in detail. The monitoring unit 130 of the monitoring server 100 monitors an operating state of the VMs 210 and 220 at intervals of, for example, one minute, via the monitoring agent 212. Also, the monitoring unit 130 checks the connection history information at the same timings.

Figure 15:
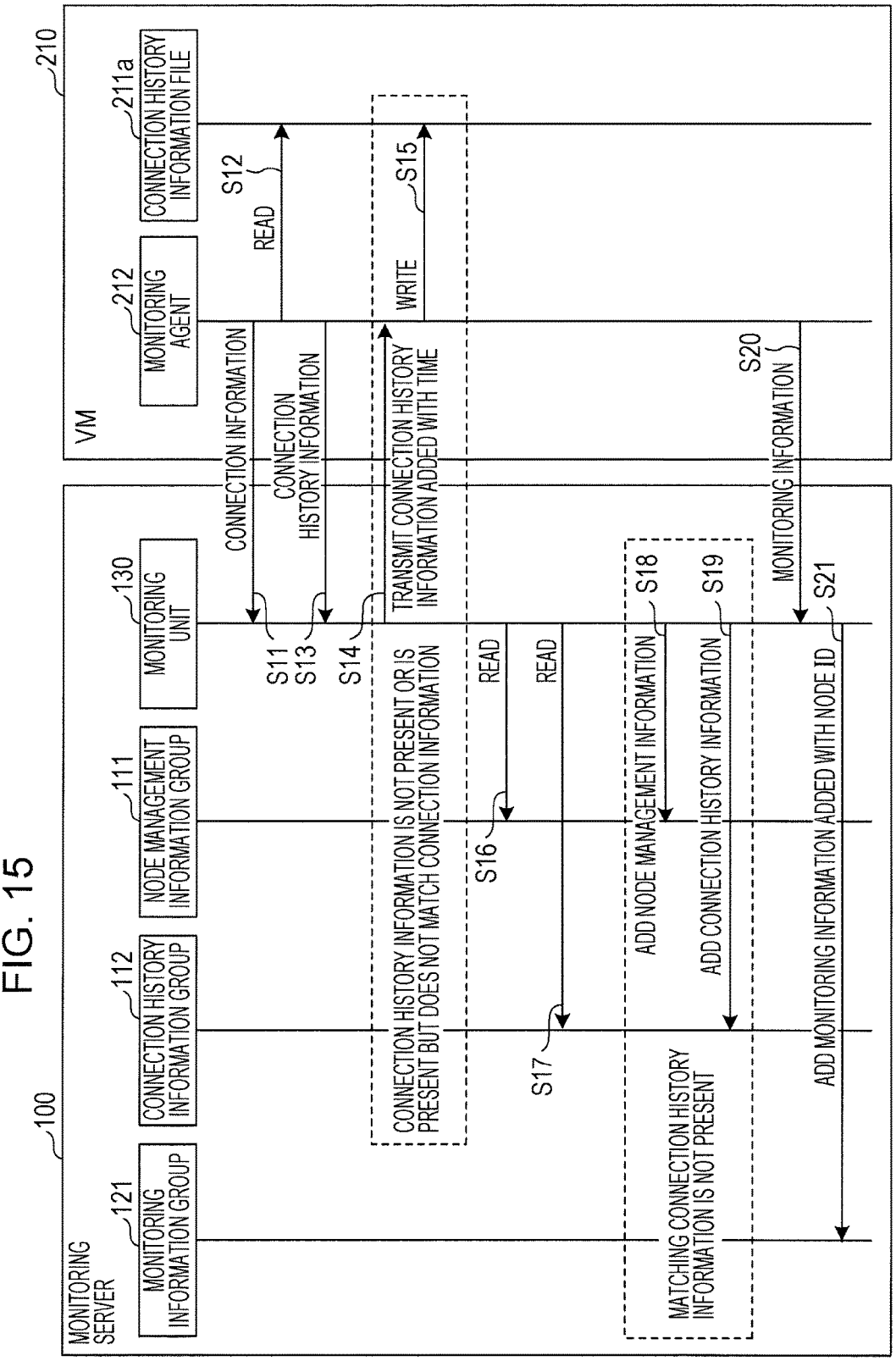
FIG. 15 is a diagram illustrating an example of an operational sequence for a monitoring process, according to an embodiment.

FIG. 15 is a sequence diagram depicting an example of a procedure of the monitoring process. For example, the monitoring agent 212 in the VM 210 transmits network connection information to the monitoring unit 130 (step S11). For example, the monitoring agent 212 transmits connection information at intervals of one minute. Also, the monitoring agent 212 reads the connection history information file 211a (step S12). The monitoring agent 212 then transmits the connection history information described in the connection history information file 211a to the monitoring unit 130 (step S13).

The monitoring unit 130 having receiving the connection information and the connection history information determines whether no connection history information is present in the VM 210 or whether the connection information in the latest connection history information and the current connection information of the VM 210 do not match each other. When either one of these two conditions is satisfied, the monitoring unit 130 transmits the connection history information added with the time of the monitoring server 100 to the monitoring agent 212 (step S14). The monitoring agent 212 writes the received connection history information in the connection history information file 211a (step S15).

Also, the monitoring unit 130 reads each node management information in the node management information group 111 (step S16). Next, the monitoring unit 130 reads each connection history information in the connection history information group 112 (step S17).

Then, when no connection history information which matches the connection history information obtained from the VM 210 is present in the connection history information group 112, the monitoring unit 130 adds new node management information corresponding to the VM 210 into the node management information group 111 (step S18). Next, correspondingly to the added node management information, the monitoring unit 130 adds the obtained connection history information to the connection history information group 112 (step S19).

The monitoring agent 212 then transmits the monitoring information (such as event log) in the VM 210 to the monitoring unit 130 (step S20). The monitoring unit 130 adds the node ID of the node management information corresponding to the VM to the received monitoring information, and adds the resultant monitoring information to the monitoring information group 121 (step S21).

Next, details of the monitoring process procedure in the monitoring unit 130 are described.

Figure 16:
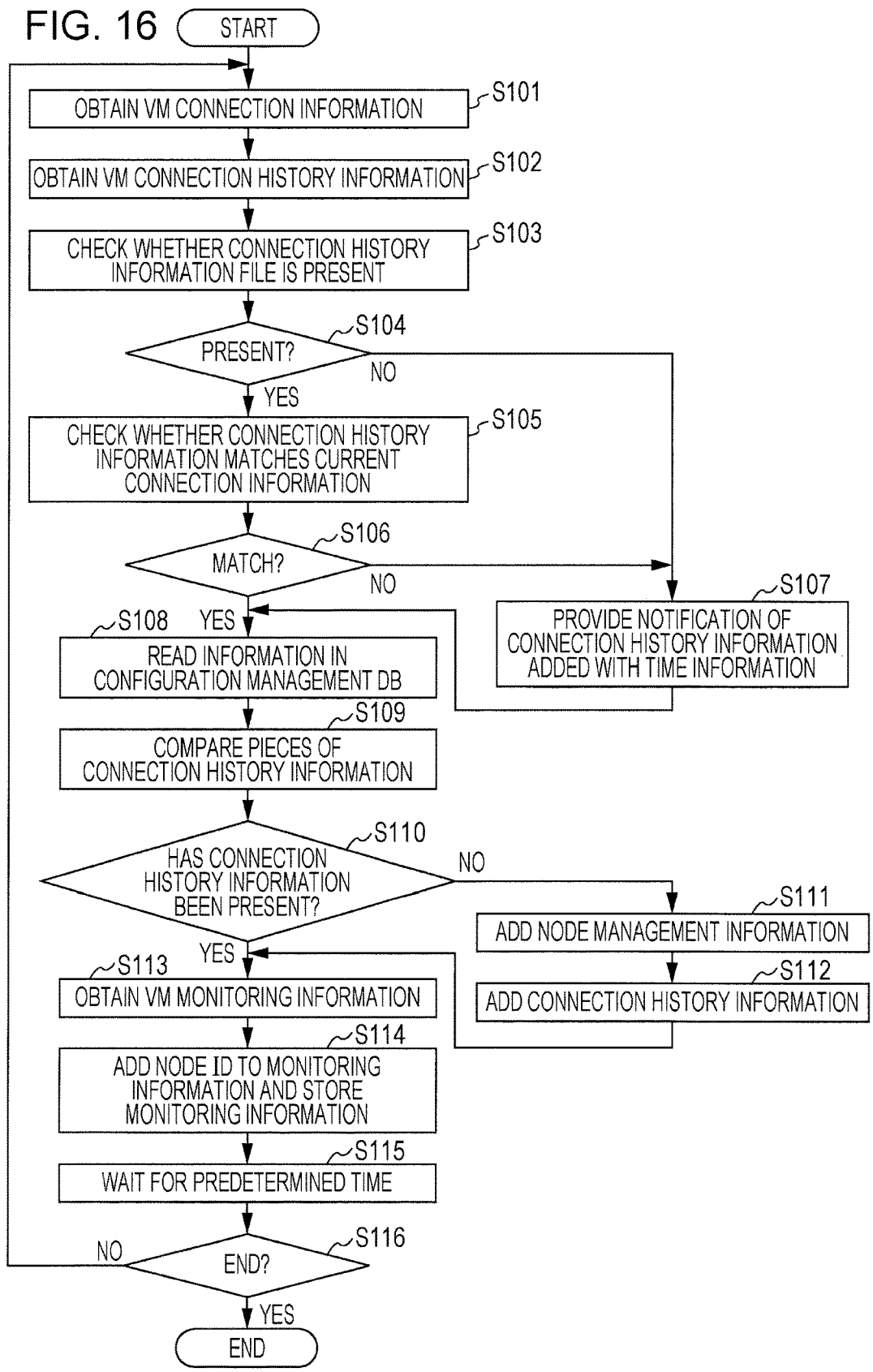
FIG. 16 is a diagram illustrating an example of an operational flowchart for a monitoring process, according to an embodiment.

FIG. 16 is an operational flowchart depicting an example of the monitoring process procedure in the monitoring unit. In the following, the process depicted in FIG. 16 is described along step numbers.

[Step S101] The monitoring unit 130 obtains network connection information of the VM 210 via the monitoring agent 212.

[Step S102] The monitoring unit 130 obtains connection history information of the VM 210 via the monitoring agent 212.

[Step S103] The monitoring unit 130 checks whether a connection history information file is present in the VM 210. For example, when the newly-create VM 210 is taken as a monitoring target for the first time, no corresponding connection history information is present.

[Step S104] When a connection history information file is present, the monitoring unit 130 proceeds to step S105. When a connection history information file is not present, the monitoring unit 130 proceeds to step S107.

[Step S105] The monitoring unit 130 checks whether a piece of connection information with the latest time in the connection history information obtained from the VM matches the current piece of connection information of the VM 210.

[Step S106] When these pieces of connection information match each other, the monitoring unit 130 proceeds to step S108. When these pieces of connection information do not match each other, the monitoring unit 130 proceeds to step S107.

[Step S107] The monitoring unit 130 notifies the monitoring agent 212 of the connection history information added with the time indicated by the internal clock of the monitoring server 100.

[Step S108] The monitoring unit 130 reads the node management information group 111 and the connection history information group 112 in the configuration management DB 110.

[Step S109] The monitoring unit 130 compares the connection history information in the configuration management DB 110 and the connection history information obtained from the VM 210. For example, the monitoring unit 130 searches the tree structure as depicted in FIG. 10 for the same connection history information from the starting point 40 along a line of one or more pieces of connection history information obtained from the VM 210. When, for all pieces of connection history information obtained from the VM 210, corresponding connection history information is present in the configuration management DB 110, the connection history information found last in the configuration management DB 110 is the connection history information corresponding to the current VM 210.

[Step S110] When connection history information corresponding to the current VM 210 is already present, the monitoring unit 130 proceeds to step S113. When connection history information corresponding to the current VM 210 is not present, the monitoring unit 130 proceeds to step S111.

[Step S111] The monitoring unit 130 adds node management information corresponding to the current VM 210 to the node management information group 111 of the configuration management DB 110. For example, on the tree structure depicted in FIG. 10, the monitoring unit 130 copies node management information corresponding to original connection history information from which the connection history information is branched. When the branching source is the starting point 40, the monitoring unit 130 generates node management information with an initial value set therein. The monitoring unit 130 then changes the value of connection information in the node management information obtained by copying or generated, to a value of the connection information of the current VM 210.

[Step S112] In association with the added node management information, the monitoring unit 130 adds connection history information to the connection history information group 112 of the configuration management DB 110. The contents of the connection history information to be added are the same as those of the connection history information last entering the connection history information file 211*a* of the current VM 210.

[Step S113] The monitoring unit 130 obtains monitoring information via the monitoring agent 212 of the VM 210.

[Step S114] The monitoring unit 130 adds a node ID of the node management information corresponding to the VM 210 to the obtained monitoring information, and stores the resultant monitoring information in the monitoring information DB 120. For example, when a notification of an anomaly is provided, details of the anomaly are stored together with the node ID indicating the node management information of the VM 210.

When node management information or connection history information is added, the monitoring unit 130 may determine whether the VM 210 as a monitoring target is a replica of another VM or is one obtained by changing the address of the existing VM, and may include the determination result in the monitoring information. For example, the monitoring unit 130 searches the configuration management DB 110 for node management information corresponding to the last connection history information in the connection history information file 211*a* of that VM 210 before the connection history information is added to the VM 210 as a monitoring target. The monitoring unit 130 then tries to connect to a VM corresponding to the relevant node management information. When connection is successful, the monitoring unit 130 determines that the VM is one obtained by replication, and stores the determination result as monitoring information in the monitoring information DB 120. When connection fails, the monitoring unit 130 determines that the VM is one obtained by changing the connection information, and stores the determination result as monitoring information in the monitoring information DB 120.

[Step S115] The monitoring unit 130 waits for a predetermined time (for example, one minute).

[Step S116] The monitoring unit 130 determines whether the monitoring process is to end. For example, when an input indicating the end of the monitoring process is provided, the monitoring unit 130 determines that the monitoring process is to end, and then the process ends. When monitoring is not to end, the process proceeds to step S101.

In this manner, it is possible to perform monitoring with each VM appropriately distinguished. In the following, for each of possible cases of occurrence of VM states, a description will be given of an example of monitoring in which VMs are distinguished. Cases of occurrence of VM states include "when VMs are not changed", "when a VM is newly added", "when a VM is replicated", "when VM connection information is changed", "when VMs having different pieces of connection history information but the same connection information are alternately started", "when a VM snapshot is returned", and "when a VM under another monitoring server is migrated".

<A Case where VMs are not Changed>

When the same operating state continues and no VM change is present, it is determined at step S104 of FIG. 16 that a connection history information file is present. Then, it is determined at step S106 of FIG. 16 that the pieces of connection information match each other. For example, the connection information (IP address, MAC address, and host name) included in the connection history information registered last in the connection history information file 211*a* of the VM 210 and the current connection information of the VM 210 are compared, and are determined to match each other.

Figure 17:
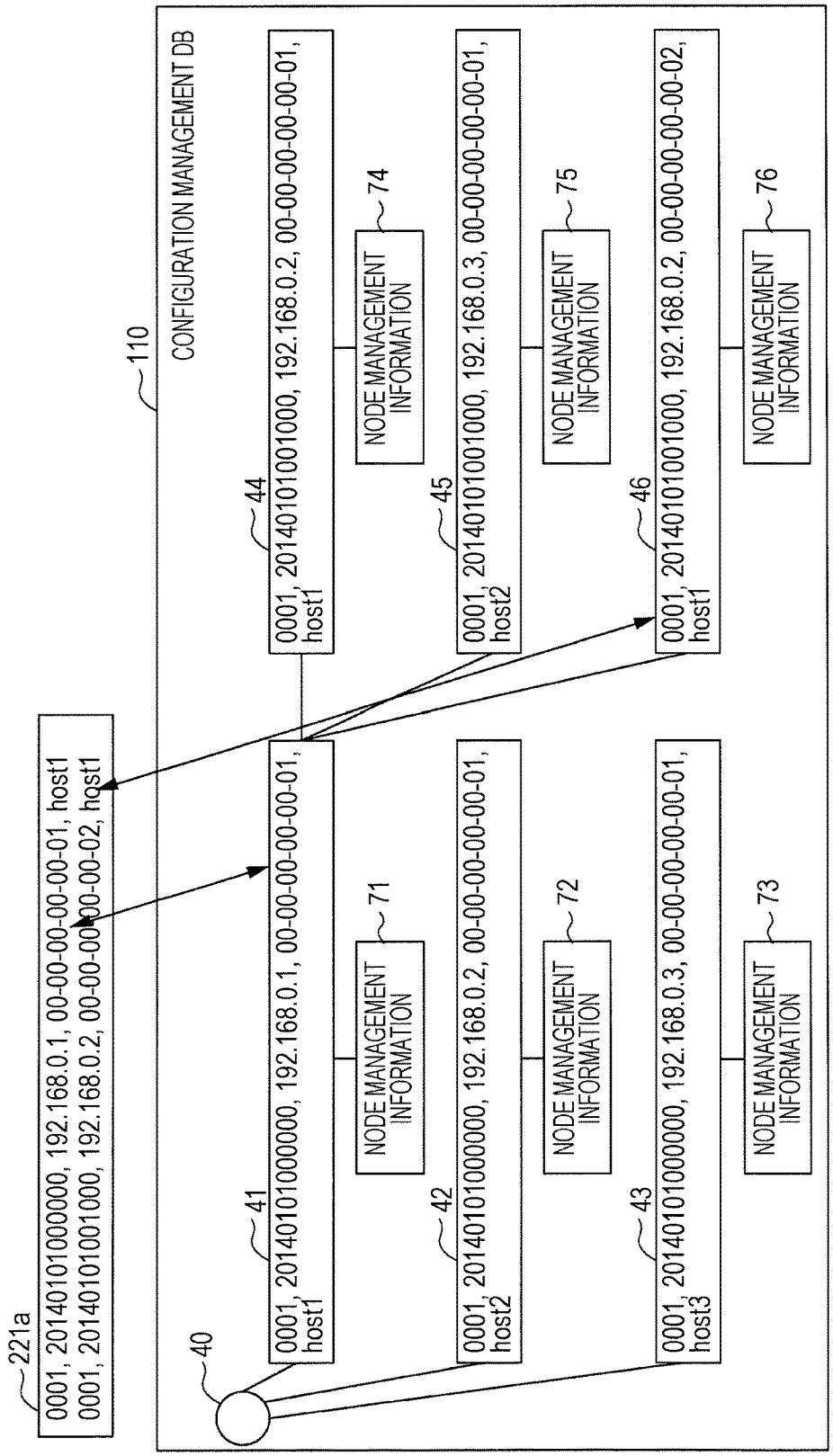
FIG. 17 is a diagram illustrating an example of determination as to whether connection history information is present, according to an embodiment.

Then, it is determined at step S110 of FIG. 16 that connection history information which matches the connection history information obtained from the VM is present in the connection history information group of the configuration management DB 110. FIG. 17 is a diagram depicting an example of determination as to whether connection history information is present. For example, it is assumed that connection history information of "0001, 20140101000000, 192.168.0.1, 00-00-00-00-00-01, host1" and "0001, 20140101001000, 192.168.0.2, 00-00-00-00-00-02, host1" are written in the connection history information file 221*a* of the VM 220. In the configuration management DB 110, a plurality of pieces of connection history information 41 to 46 are connected in a tree structure, and are associated with the node management information 71 to 76, respectively.

From the starting point 40 of the tree structure indicating the connection history information group of the configuration management DB 110, the monitoring unit 130 follows connection history information which matches the connection history information included in the connection history information file 221*a*, and determines connection history information which matches the connection history information file 221*a*. For example, of the pieces of connection history information 41 to 43 straight under the starting point 40, the connection history information 41 which matches the first connection history information of "0001, 20140101000000, 192.168.0.1, 00-00-00-00-00-01, host1" in the connection history information file 221*a* is detected. Next, of the pieces of connection history information 44 to 46 straight under the connection history information 41, the connection history information 46 which matches the second connection history information of "0001, 20140101001000, 192.168.0.2, 00-00-00-00-00-02, host1" in the connection history information file 221*a* is detected. The connection history information 46 is determined as connection history information which matches the connection history information in the connection history information file 221*a*.

Thus, the monitoring unit 130 monitors the VM 220 by following monitoring settings indicated by the node management information 76 corresponding to the connection history information 46.

<A Case where VM is Newly Added>

Next, monitoring process in a case where a new VM is generated without replicating another VM nor changing the setting thereof, is described.

When a new VM is generated, the VM does not have a connection history information file. Therefore, the monitoring unit 130 determines at step S104 of FIG. 16 that no connection history information file is present, and notification of connection history information is made at step S107. Then, a connection history information file is created in the newly created VM.

Then, it is determined at step S110 of FIG. 16 that no connection history information, which matches the connection history information that has been notified to the VM, is present in the configuration management DB 110, and corresponding node management information and connection history information are added to the configuration management DB 110. The connection history information corresponding to the newly-created VM has the immediately preceding history ID section (refer to FIG. 9) blank, and is connected straight below the starting point 40 in the tree structure. Also, as for monitoring settings in the node management information of the newly-created VM, a process initial value is set. The user may freely change monitoring settings of the node management information with the initial value set therein. Then, the monitoring unit 130 monitors the newly-added VM according to the monitoring settings indicated by the newly-generated node management information 76.

<A Case where a VM is Replicated>

Next, the case in which a VM is replicated is described. An existing VM is replicated for using a VM with the same structure as that of a replication source VM for the same purpose as that of the replication source VM. The VM obtained by replication is assumed to be started by changing connection information for connection to a network.

For the VM obtained by replication, a connection history information file is obtained also by replicating the connection history information file of the connection source. Therefore, when the VM obtained by replication is a monitoring target, it is determined at step S104 of FIG. 16 that a connection history information file is present. However, it is determined at step S106 of FIG. 16 that connection information does not match, and connection history information based on the current connection information is added to the connection history information file of the monitoring target VM.

Then, it is determined at step S110 of FIG. 16 that no connection history information, which matches the connection history information that has been notified to the VM, is present in the configuration management DB 110, and corresponding node management information and connection history information are added to the configuration management DB 110 (refer to FIG. 14). Here, the node management information to be added is generated by copying node management information corresponding to the replication source VM. The monitoring unit 130 then monitors the VM obtained by replication according to monitoring settings indicated by the added node management information.

In this manner, the node management information corresponding to the VM obtained by replication is added onto the monitoring server 100, and the user may monitor the VM obtained by replication with the same settings as those of the replication source VM.

<A Case where VM Connection Information is Changed>

Next, the case in which the connection information of an existing VM is changed is described.

When the connection information of an existing VM is changed and the VM is a monitoring target, it is determined at step S104 of FIG. 16 that a connection history information file is present. However, it is determined at step S106 of FIG. 16 that connection information does not match, and connection history information based on the current connection information is added to the connection history information file of the monitoring target VM.

Then, it is determined at step S110 of FIG. 16 that no connection history information, which matches the connection history information that has been notified to the VM, is present in the configuration management DB 110, and corresponding node management information and connection history information are added to the configuration management DB 110 (refer to FIG. 14). Here, the node management information to be added is generated by copying node management information corresponding to the replication source VM. The monitoring unit 130 then monitors the VM with the connection information changed, according to monitoring settings indicated by the added node management information.

In this manner, the node management information corresponding to the VM with the settings changed is added onto the monitoring server 100. Therefore, the user may monitor the VM with the same settings as those of the node management information of the change source.

<A Case where VMs Having Different Pieces of Connection History Information but Same Connection Information are Alternately Started>

Two existing VMs may be assigned temporary connection information and alternately used. For example, while one VM is being used, the other VM may be subjected to maintenance operation such as VM backup.

Figure 18:
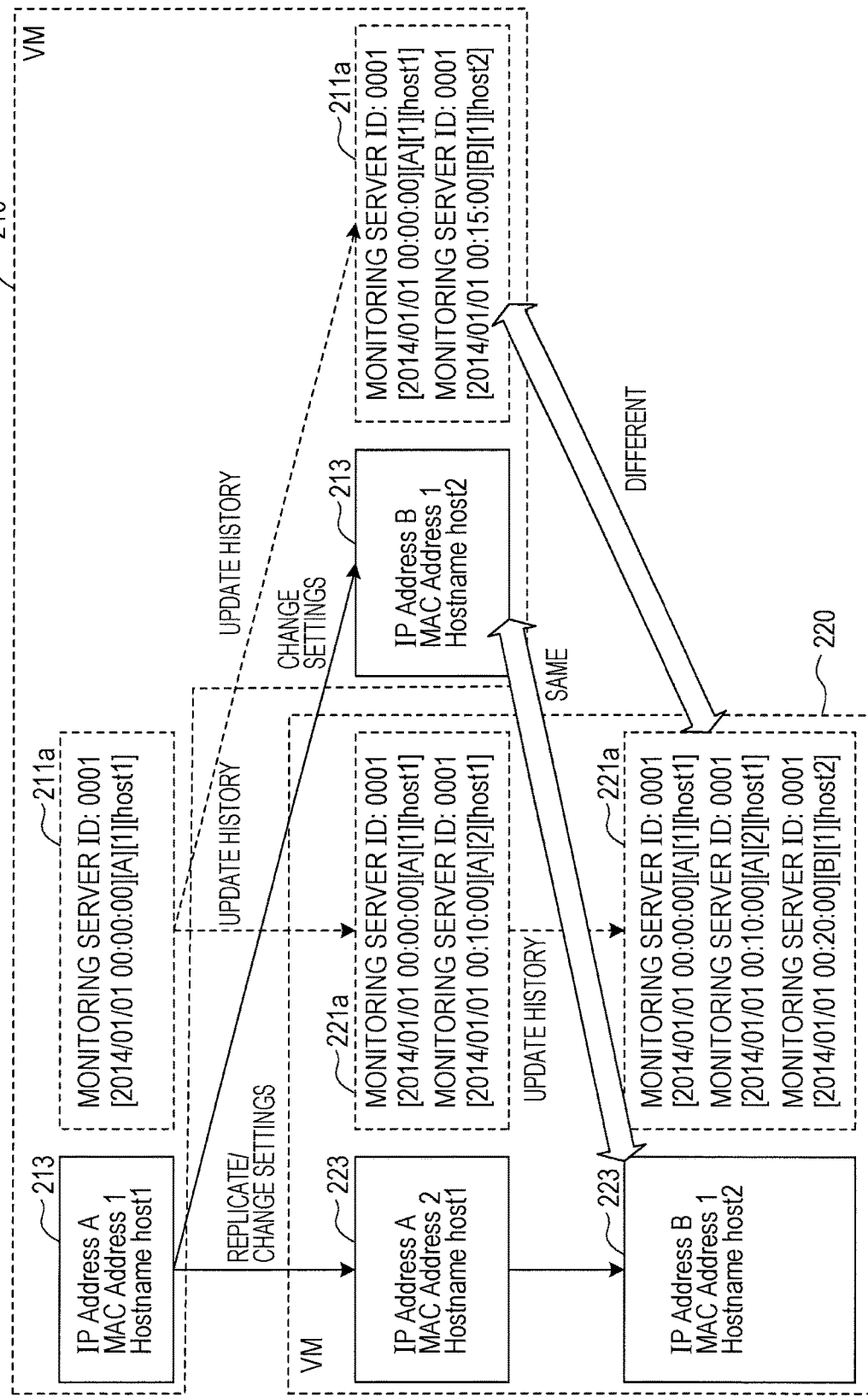
FIG. 18 is a diagram illustrating an example of VMs having different pieces of connection history information but the same connection information, according to an embodiment.

FIG. 18 is a diagram depicting an example of VMs having different pieces of connection history information but the same connection information. For example, when a VM 220 is replicated from a VM 210, it is assumed that the MAC address of the VM 220 is changed. At the time of generating the VM 220, the contents of a connection history information file 221a of the VM 220 are the same as the contents of a connection history information file 211a of the VM 210. In initial monitoring process on the VM 220, connection information 223 of the VM 220 and connection information included in the latest connection history information in the connection history information file 221a are different from each other, and therefore the connection history information file 221a is updated. Thereafter, when the MAC address and the host name of the connection information 223 of the VM 220 are changed, the connection history information file 221a is again updated. Also, when the host name of the connection information 213 of the VM 210 is updated, the connection history information file 211a is updated by the subsequent monitoring process. As a result, the connection information 213 of the VM 210 and the connection information 223 of the VM 220 are the same.

Thereafter, in monitoring process on the respective VMs 210 and 220, it is determined at step S104 of FIG. 16 that a connection history information file is present. Also at step S106 of FIG. 16, it is determined that the pieces of network connection information match each other.

Then, it is determined at step S110 of FIG. 16 that connection history information which matches the latest connection history information of each of the VMs 210 and 220 is present in the configuration management DB 110. However, the determination at step S110 is made by tracing the tree structure of the connection history information group 112 in the configuration management DB 110 from the starting point 40 in the order of the connection history information registered in the connection history information files 211a and 221a. The connection history information file 221a of the VM 220 includes connection history information of "monitoring server ID: 0001[2014/01/01 00:10:00][A][2][host1]", which is different from the connection history information file 211a of the VM 210. Therefore, the connection history information in the configuration management DB 110 corresponding to the VM 210 and the connection history information in the configuration management DB 110 corresponding to the VM 220 are different from each other. As a result, the monitoring server 100 recognizes that the VM 210 and the VM 220 are different VMs. That is, on the monitoring server 100, the VM 210 and the VM 220 are monitored as different VMs.

In this manner, with VM replication and change of connection information, a plurality of VMs with the same connection information are generated, and may be monitored distinguishably even if the VMs are alternately used.

<A Case where a VM Snapshot is Returned>

After a snapshot of a VM is created, the VM may be returned to a previous state by using the snapshot. In this case, the VM is started with the network connection information also being in a previous state.

When the VM returned to the previous state is a monitoring target, it is determined at step S104 of FIG. 16 that a connection history information file is present. Also, it is determined at step S106 of FIG. 16 that connection information matches. Then, it is determined at step S110 of FIG. 16 that connection history information corresponding to the connection history information included in the connection history information file is present in the configuration management DB 110.

Figure 19:
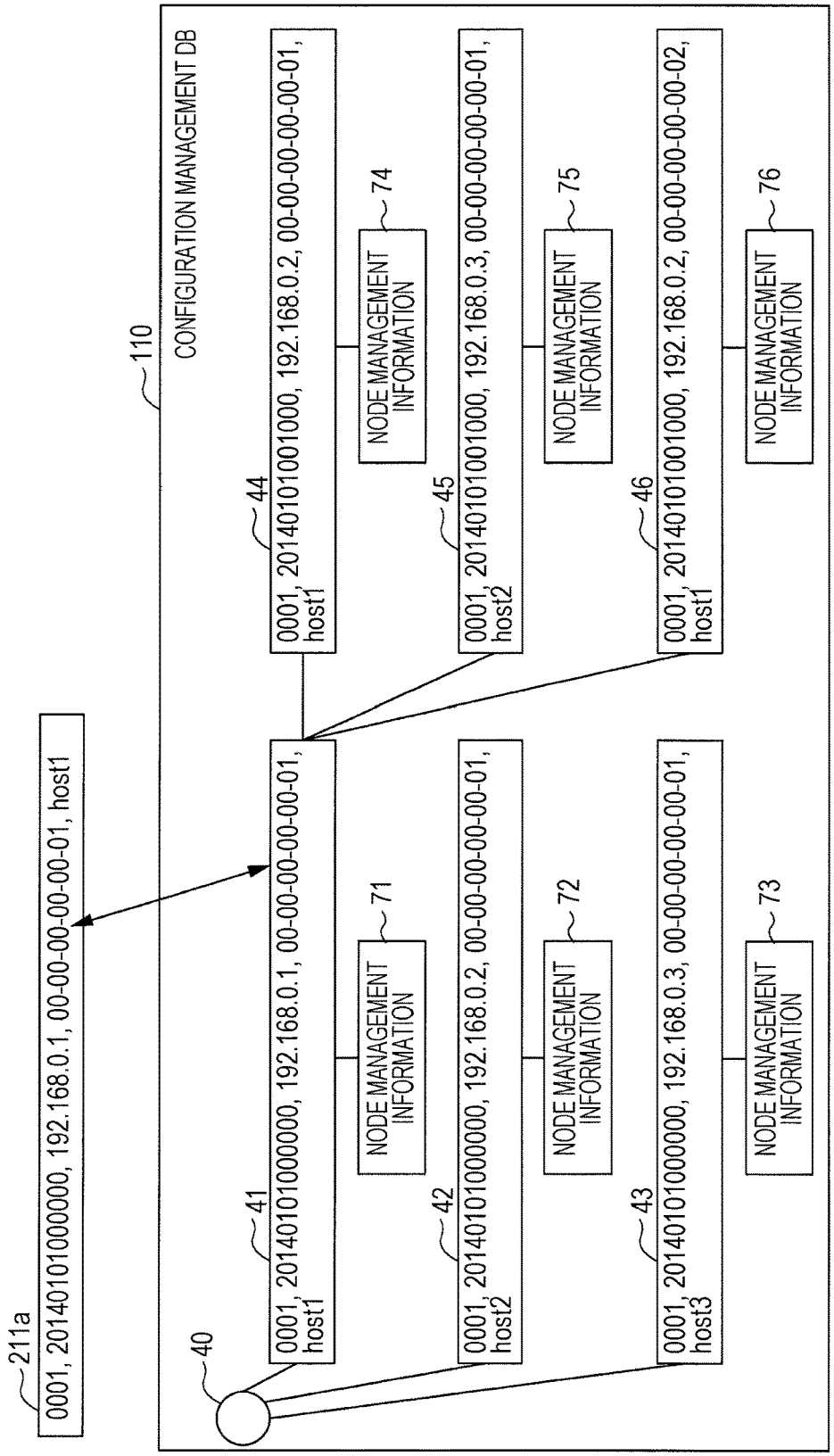
FIG. 19 is a diagram illustrating an example of comparison of pieces of connection history information when a snapshot is returned, according to an embodiment.

FIG. 19 is a diagram depicting an example of comparison of pieces of connection history information when a snapshot is returned. For example, it is assumed that after the connection information of the VM 210 is once changed, the VM 210 is returned to a previous state with a snapshot obtained before change. In this case, when the tree structure of the connection history information group in the configuration management DB 110 is traced along the connection history information included in the connection history information file 211a of the VM 210, a search ends at the connection history information 41 straight below the starting point 40. Then, the node management information 71 corresponding to that connection history information 41 is determined as the node management information 71 corresponding to the current VM 210. As a result, monitoring is performed according to monitoring setting indicated by the node management information 71, with the same settings at the time of creating the snapshot.

In this manner, when a VM is returned to a previous state by returning a snapshot, the VM may be monitored with the settings at the time of creating the snapshot.

<A Case where a VM Under Another Monitoring Server is Migrated>

The plurality of VM hosts 200 and 200a may each configure a separate network system. In this case, in each network system, VMs are monitored by a separate monitoring server. Here, a VM is able to be migrated between or among networks being monitored by separate VM hosts. When temporary connection information is used, by migrating a VM to another system, a plurality of VMs with redundant connection information may possibly be simultaneously present on a work system as a migration destination. In the second embodiment, since a monitoring server ID is provided to the connection history information, even if a VM is migrated over network systems, each VM may be reliably identified on a network system as a migration destination.

FIG. 20 is a diagram depicting an example when a VM under another monitoring server is migrated. The example of FIG. 20 represents the case in which the VM 220 being monitored by the monitoring server 100a with a monitoring server ID of "0002" is migrated under monitoring of the monitoring server 100 with a monitoring server ID of "0001". Under the monitoring server 100, the VM 210 has already been operating, and the connection information 213 of the VM 210 and the connection information 223 of the VM 220 match each other.

In this case, when monitoring process is performed with the migrated VM 220 taken as a monitoring target, it is determined at step S104 of FIG. 16 that a connection history information file is present. It is determined at step S106 of FIG. 16 that connection information matches.

In the monitoring server 100 newly starting monitoring, the connection history information of the monitoring server ID "0002" indicated in the connection history information file 221a of the VM 220 is not managed in the configuration management DB 110. Therefore, it is determined at step S110 of the FIG. 16 that no corresponding connection history information is present. As a result, node management information and connection history information are added to the configuration management DB 110. Then, the migrated VM 220 is monitored according to the node management information corresponding to the VM 220 added to the monitoring server 100.

In this manner, when the VM 220 under the other monitoring server 100a is migrated under the monitoring server 100, the VM 220 may be monitored as a different VM even if the connection information is the same as the connection information of the VM 210 which has been under the monitoring server 100.

While the embodiments have been exemplarily described above, the structure of each unit described in the embodiments may be replaced by another structure with a similar function. Also, any other component and process may be added. Furthermore, any two or more structures (features) of the above-described embodiments may be combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program that causes a computer to execute a process comprising:
at a first time of detecting, from among a plurality of virtual machines as management targets, a first virtual machine that has not stored therein identification information generated based on an internal time of the computer, generating first identification information of the first virtual machine, the first identification information being unique to a first internal time of the computer corresponding to the first time;
transmitting the first identification information to the first virtual machine to store the first identification information therein;
at a second time of detecting a second virtual machine which has stored the first identification information and whose setting regarding network connection has been changed after storing the first identification information, generating second identification information of the second virtual machine, the second identification information being unique to a second internal time of the computer corresponding to the second time;
transmitting the second identification information to the second virtual machine to store the second identification information therein;
when the computer is able to connect with the first virtual machine identified based on the first identification information stored in the second virtual machine, at the second time of detecting the second virtual machine, determining that the second virtual machine is a replica of the first virtual machine; and
when the computer is unable to connect with the first virtual machine at the second time of detecting the second virtual machine, determining that the second virtual machine is the first virtual machine whose setting regarding network connection has been changed.

2. The non-transitory, computer-readable recording medium of claim 1, wherein the process further comprises:
identifying each of the plurality of virtual machines, based on the first or second identification information that is respectively stored in the plurality of virtual machines.

3. The non-transitory, computer-readable recording medium of claim 1, wherein the process further comprises:
when transmitting the first identification information to the first virtual machine, storing, in a memory provided for the computer, first management information for managing the first virtual machine, in association with the stored first identification information; and
when transmitting the second identification information to the second virtual machine, storing, in the memory, second management information for managing the second virtual machine, in association with the second identification information, the second management information including the first management information.

4. The non-transitory, computer-readable recording medium of claim 1, wherein:
the first identification information includes connection information indicating setting regarding network connection of the first virtual machine; and
the detecting of the second virtual machine includes comparing connection information indicating setting regarding network connection of the second virtual machine with the first identification information stored in the second virtual machine.

5. The non-transitory, computer-readable recording medium of claim 1, wherein:
the first identification information includes device identification information for identifying the computer; and the second identification information includes the device identification information for identifying the computer.

6. A method performed by a computer, the method comprising:

at a first time of detecting, from among a plurality of virtual machines as management targets, a first virtual machine that has not stored therein identification information generated based on an internal time of the computer, generating first identification information of the first virtual machine, the first identification information being unique to a first internal time of the computer corresponding to the first time;

transmitting the first identification information to the first virtual machine to store the first identification information therein;

at a second time of detecting a second virtual machine which has stored the first identification information and whose setting regarding network connection has been changed after storing the first identification information, generating second identification information of the second virtual machine, the second identification information being unique to a second internal time of the computer corresponding to the second time;

transmitting the second identification information to the second virtual machine to store the second identification information therein;

when the computer is able to connect with the first virtual machine identified based on the first identification information stored in the second virtual machine, at the second time of detecting the second virtual machine, determining that the second virtual machine is a replica of the first virtual machine; and when the computer is unable to connect with the first virtual machine at the second time of detecting the second virtual machine, determining that the second virtual machine is the first virtual machine whose setting regarding network connection has been changed.

7. An apparatus comprising:
a memory; and
a processor coupled to the memory, and the processor configured to:

at a first time of detecting, from among a plurality of virtual machines as management targets, a first virtual machine that has not stored therein identification information generated based on an internal time of the processor, generate first identification information of the first virtual machine, the first identification information being unique to a first internal time of the computer corresponding to the first time, transmit the first identification information to the first virtual machine to store the first identification information therein;

at a second time of detecting a second virtual machine which has stored the first identification information and whose setting regarding network connection has been changed after storing the first identification information, generate second identification information of the second virtual machine, the second identification information being unique to a second internal time of the processor corresponding to the second time;

transmit the second identification information to the second virtual machine to store the second identification information therein;

when the processor is able to connect with the first virtual machine identified based on the first identification information stored in the second virtual machine, at the second time of detecting the second virtual machine, determining that the second virtual machine is a replica of the first virtual machine; and when the processor is unable to connect with the first virtual machine at the second time of detecting the second virtual machine, determining that the second virtual machine is the first virtual machine whose setting regarding network connection has been changed.

* * * * *